US006548981B1

(12) United States Patent
Ishii et al.

(10) Patent No.: US 6,548,981 B1
(45) Date of Patent: Apr. 15, 2003

(54) ACTUATOR

(75) Inventors: Shinji Ishii, Kanagawa (JP); Yoshihiro Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/647,388

(22) PCT Filed: Feb. 10, 2000

(86) PCT No.: PCT/JP00/00755

§ 371 (c)(1),
(2), (4) Date: Oct. 17, 2000

(87) PCT Pub. No.: WO00/48296

PCT Pub. Date: Aug. 17, 2000

(30) Foreign Application Priority Data

Feb. 10, 1999 (JP) ............................. 11-033386

(51) Int. Cl.[7] .............................................. H02K 7/00
(52) U.S. Cl. ......................... 318/538; 318/15; 318/254; 318/471; 318/473; 388/934
(58) Field of Search .............................. 318/9–15, 560, 318/138, 254, 439, 538, 461, 463, 464, 471, 473; 388/934

(56) References Cited

U.S. PATENT DOCUMENTS

| 3,562,564 | A | * | 2/1971 | Potter ............................ 310/54 |
| 4,482,847 | A | * | 11/1984 | Rudich, Jr. et al. ............. 318/9 |
| 4,613,798 | A | * | 9/1986 | Baumann ..................... 318/160 |
| 4,668,898 | A | * | 5/1987 | Harms et al. ................ 318/254 |
| 4,727,301 | A | * | 2/1988 | Fulks et al. .................. 318/468 |
| 4,773,829 | A |   | 9/1988 | Vettori |
| 4,779,031 | A |   | 10/1988 | Arends et al. |
| 4,857,812 | A | * | 8/1989 | Mochizuki et al. ............ 318/15 |
| 4,922,171 | A | * | 5/1990 | Ohi .............................. 318/471 |
| 5,159,218 | A |   | 10/1992 | Murry et al. |
| 5,184,050 | A | * | 2/1993 | Harada et al. ................ 318/467 |
| 5,327,064 | A |   | 7/1994 | Arakawa et al. |
| 5,418,451 | A |   | 5/1995 | Maass et al. |
| 5,428,470 | A |   | 6/1995 | Labriola, II |
| 5,577,152 | A | * | 11/1996 | Chen ........................... 388/804 |
| 5,672,135 | A |   | 9/1997 | Hamada |
| 5,912,541 | A | * | 6/1999 | Bigler et al. ................. 318/600 |
| 5,990,586 | A | * | 11/1999 | Milano, Jr. ................. 310/75 R |
| 6,188,196 | B1 | * | 2/2001 | Koide et al. ................. 318/700 |
| 6,346,784 | B1 | * | 2/2002 | Lin ................................. 318/9 |

FOREIGN PATENT DOCUMENTS

| DE | 19546180 A1 | 12/1995 | ........... F16H/48/02 |
| DE | 19543284 A1 | 5/1997 | |
| FR | 2 712 124 | 5/1995 | ........... H02K/21/12 |
| GB | 2284106 | 11/1994 | ........... H02K/7/116 |
| GB | 2296789 | 7/1996 | ........... G05D/13/62 |
| JP | 63-56155 | 3/1988 | ........... H02K/23/66 |
| JP | 2-36790 | 2/1990 | ........... H02P/7/00 |
| JP | 2-228290 | 9/1990 | ........... H02P/6/02 |
| JP | 4-351454 | 12/1992 | ........... H02K/29/00 |
| JP | 7-337072 | 12/1995 | ........... H02P/6/12 |
| JP | 8-184349 | 7/1996 | ........... F16H/1/32 |
| JP | 8-265919 | 10/1996 | ........... B60L/15/28 |
| JP | 11-27984 | 1/1999 | ........... H02P/6/24 |

* cited by examiner

Primary Examiner—Bentsu Ro
(74) Attorney, Agent, or Firm—Bell, Boyd & Lloyd LLC

(57) ABSTRACT

In the actuator device, there are provided the control means to control the rotation of the rotor axis via the driving means in the housing, the rotor axis rotation displacement detection means for detecting the rotation displacement of the rotor axis in the housing, the rotor axis supported rotation-free, the permanent magnet integrated concentrically with said rotor axis, the magnetic field generation means to generate the magnetic field that makes the permanent magnet generate the rotating power, and a temperature sensor for detecting the temperature of the permanent magnet.

13 Claims, 18 Drawing Sheets

ACTUATOR

TECHNICAL FIELD

The present invention relates to an actuator device and is suitably applied to such as an AC (alternating current) servo motor.

BACKGROUND ART

Heretofore, in the AC servo motor, a rotor supported rotation-free and a stator consisting multiple stator iron-cores placed at predetermined intervals around said rotor and multiple coils wound around each stator-core are stored in one piece in the motor case.

Furthermore, in this AC servo motor, a rotation position sensor for detecting the rotation position of the axis of rotor (hereinafter referred to as rotor axis) is provided at the reversed rotation torque output side of the rotor axis outside of the motor case.

Then, in the actuator system utilizing such AC servo motor, a controller is provided in addition to the AC servo motor. And this controller executed various calculation processings for obtaining the desired rotation output in utilizing sensor signal to be put out from the rotation position sensor of the AC servo motor, and giving the driving current based on said calculation result from the controller to the AC servo motor, the controller controls the rotation of said AC servo motor.

However, in such actuator system, 3 wires for rotation driving coil and 4 to 12 wires for the rotation position sensor, totaling 7 to 15 comparatively large wires are required to connect between the controller and the AC servo motor as cable. Moreover, as the material of such wires, wirings having special cable specifications considering the effects of noise and break in cable caused by the mechanical vibration became necessary.

Furthermore, in such actuator system, since wirings between the controller and controllers of the upper ranks are necessary in addition to the wiring between the AC servo motor and said controller, wire cables become numerous and the construction of the system becomes complicated and its assembly task becomes worse.

Furthermore, in such actuator system, since the rotor and the rotation position sensor of the AC servo motor are placed apart, the rotor axis of the AC servo motor has to be thick in order that it can conduct the positioning efficiently and at high speed. And moreover, as the construction material of the coupling part, the material having high stiffness mechanically is required, it caused a problem that the system as a whole became heavy and large.

Furthermore, since in such actuator system, rotation position sensor is large and heavy, a large AC servo motor is required to conduct positioning at high speed and moreover, as its bearings high solidity bearing is required.

Furthermore, in such actuator system, the maximum value of the driving current to be given to the AC servo motor is limited due to heating of the AC servo motor while driving. However, in practice, since only low electric current containing a safety factor can be supplied to the AC servo motor, it caused a problem that the restriction is imposed on the output torque.

DISCLOSURE OF THE INVENTION

The present invention has been done considering the above points and is proposing an actuator device capable of simplifying the construction of actuator system and easily miniaturizing in improving its performance.

To obviate such problems according to the present invention, in the actuator device, the control means to control rotation of the rotor axis via the driving means is provided in the housing. As a result, in this actuator device, the number of wirings connected between the external devices can be remarkably decreased. Thus, an actuator device capable of simplifying the construction of actuator system can be realized.

Furthermore, according to the present invention, in the actuator device, the rotor axis rotation displacement detection means for detecting the rotation displacement of the rotor axis is provided in the housing. As a result, the rotation displacement of the rotor axis can be conducted with high precision and moreover, the positioning can be conducted efficiently and at high speed without increasing the size of the rotor axis and not using high solidity material as the material of said rotor axis. Thus, an actuator device capable of improving the performance and easily mini-sizing can be realized.

Furthermore, according to the present invention, we provide a rotor axis, a permanent magnet integrated concentrically with said rotor axis, the magnetic field generation means for generating the rotation power to the permanent magnet by generating magnetic field having the magnitude corresponding to the value of electric current of the driving current to be supplied, and a temperature sensor for detecting the temperature of the permanent magnet. As a result, in this actuator device, the actually acceptable upper limit of the current value of the driving electric current to be given to the coil can be easily detected based on the output of the temperature sensor. And thus, an actuator device capable of improving the performance can be realized.

BEST MODE FOR CARRYING OUT THE INVENTION

With reference to the accompanying figures one embodiment of the present invention will be described.

(1) Construction of AC Servo Motor according to the Embodiment

Figure 1:
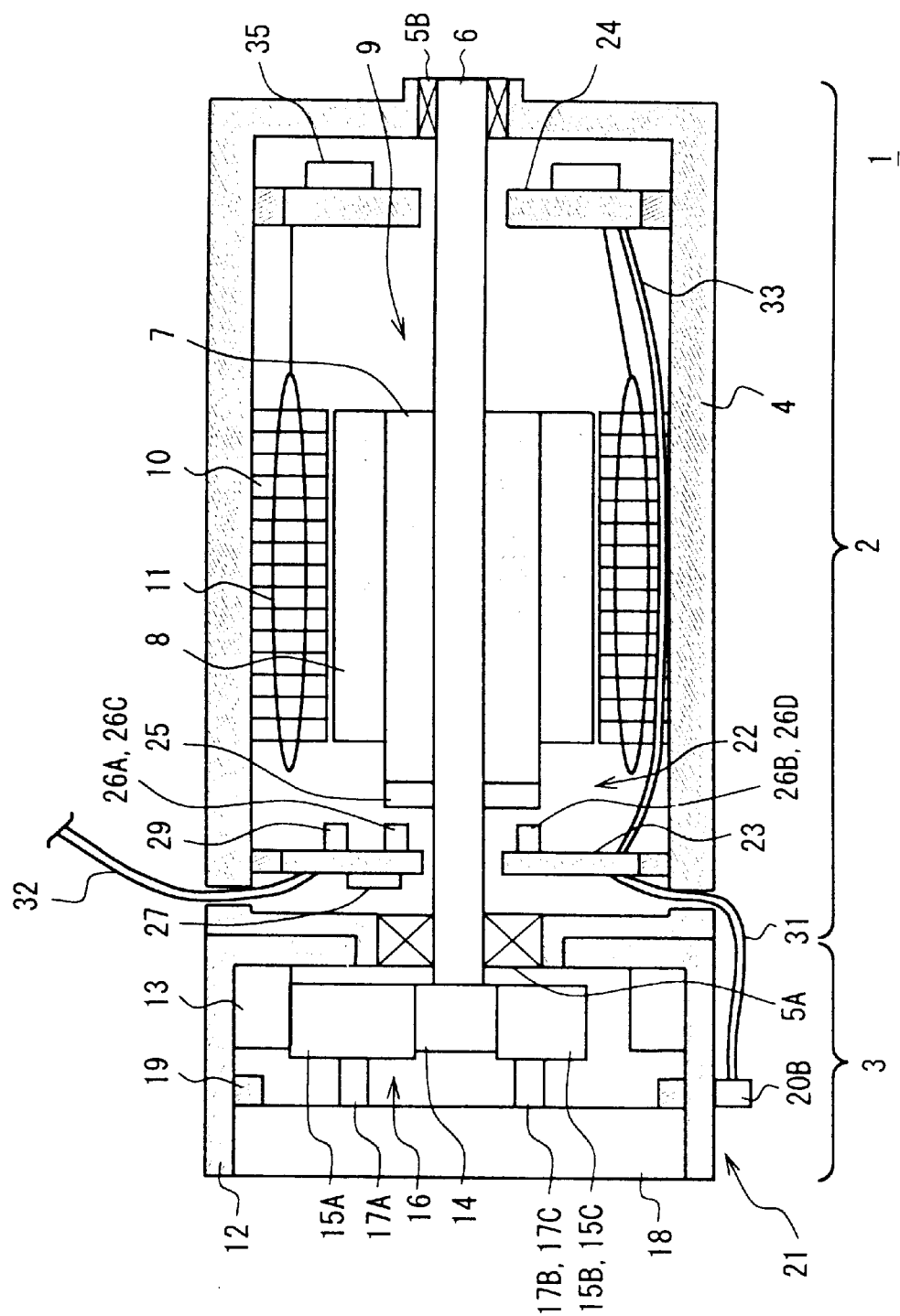
FIG. 1 is a cross sectional view showing the construction of an AC servo motor according to the embodiment of the present invention.

In FIG. 1, 1 generally shows an AC servo motor according to the embodiment of the present invention. This AC servo motor comprises a motor unit 2 for generating rotation torque, and a torque amplifier unit 3 to amplify and output the rotation torque generated in said motor unit 2.

In the motor unit 2, a rotor axis 6 supported rotation-free by bearings 5A and 5B inside of the motor case 4 formed of conductive material such as metal is provided. And a rotor 9 is formed by a rotor substrate 7 and a rotor magnet 8 formed of ring shaped permanent magnet magnetized to four poles like FIGS. 2(B) and (C) integrated concentrically with the rotor axis 6.

Figure 3:
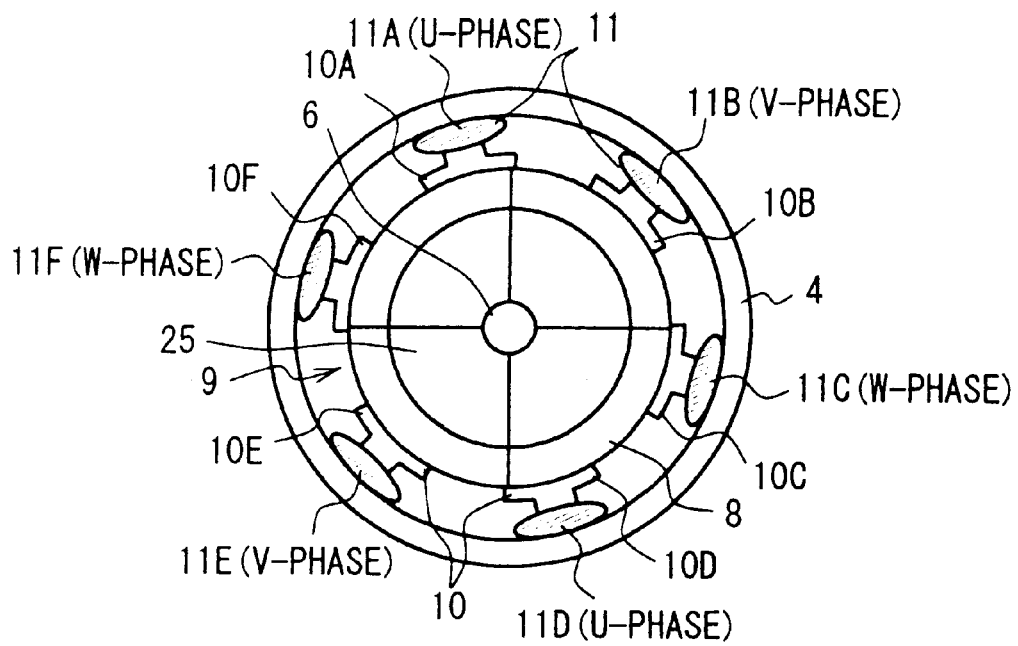
FIG. 3 is a brief linear diagram showing the positioning relation of the rotor and the stator iron core.
Figure 4:
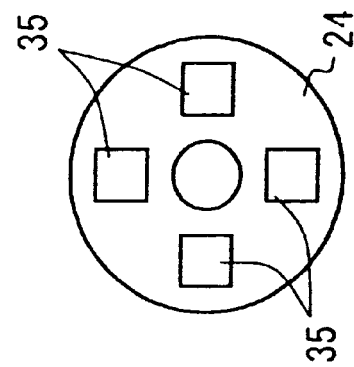
FIGS. 4(A), 4(B) and 4(C) are brief linear diagrams showing constructions of the stator and the power substrate.
Figure 4:
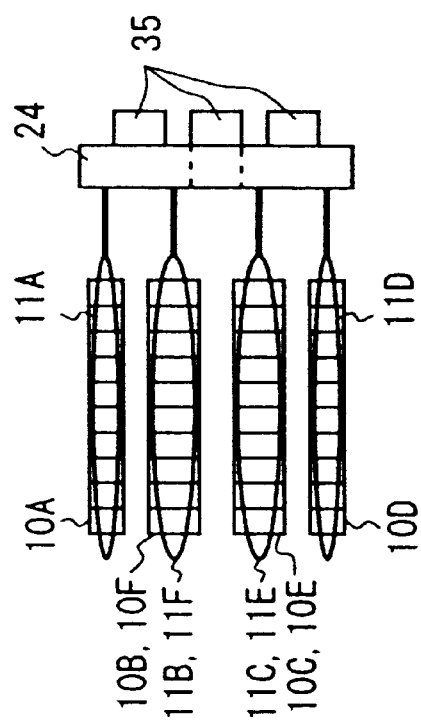
Figure 4:
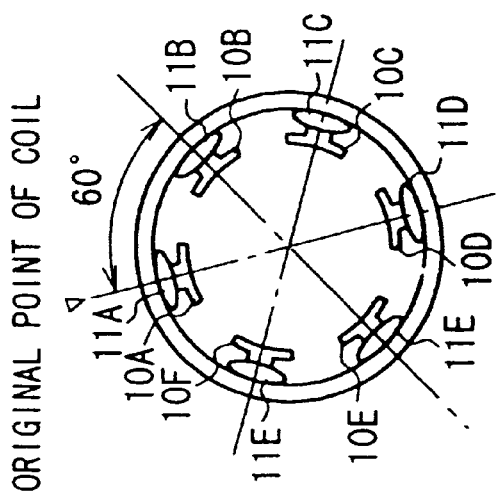

Furthermore, as shown in FIG. 3 and FIG. 4(A), six stator iron cores 10A~10F are attached around the rotor 9 at regular intervals (60[°] interval) inside of the motor case 4. And each stator iron core 10 (10A~10F) is wound by wire respectively and coil 11 (11A~11F) will be formed.

With this arrangement, in the motor unit 2, pairing 180[°] opposing 2 coils 11 (11A and 11D, 11B and 11E, 11C and 11F) as a unit (total 3 units) and making these as U-phase, V-phase and W-phase respectively. And applying driving current with the phase delayed by 120[°] to each coil 11 of the U-phase, V-phase and W-phase respectively, and by making each coil 11 generate the magnetic field having the magnitude corresponding to the current value of the driving current, the rotation torque having the magnitude corresponding to the current value of the driving current can be generated via the rotor 9.

On the other hand, as shown in FIGS. 5(A)~(C), in the torque amplifier unit 3, a gear case 12 fixed removable to the tip of the motor case 4. And inside of this gear case 12, a ring-shaped inner gear 13 fixed to the inside surface of the gear case 12, a sun gear 14 fixed to the tip terminal of the rotor axis 6, and a planet gear system 16 formed of the first~the third planet gears 15A~15C placed at 120[°] intervals between the inner gear 13 and the sun gear 14 are provided.

Furthermore, each axis 17A~17C of the first the third planet gears 15A~15C of the planet gear system is fixed respectively to the output axis 18 placed removable at the tip of the gear case 12.

Thus, in this torque amplifier unit 3, the rotation torque supplied from the motor unit 2 through the rotor axis 6 can be amplified via the planet gear system 16 and transmitted to the output axis 18 and can be transmitted to the outside via said output axis 18.

Furthermore, in the torque amplifier unit 3, a ring-shaped resin magnet 19 fixed to the output axis 1, and a one-turn absolute angle sensor 21 formed by the first and the second magnetic sensors (hereinafter referred to as Hall element) fixed to the outside surface of the gear case 12 facing to the outside surface of the resin magnet 19 are provided.

Figure 6:
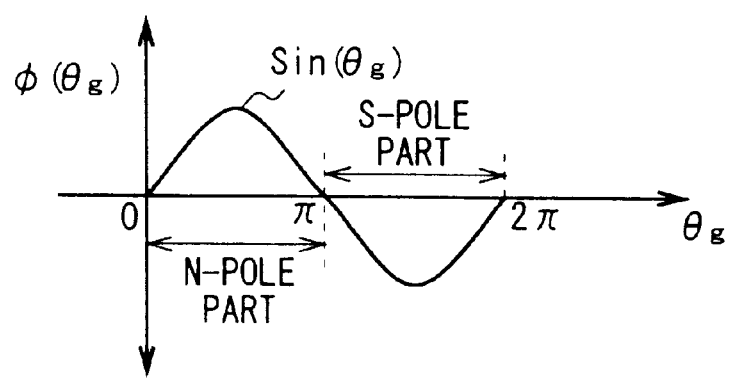
FIG. 6 is a characteristic curvilinear diagram illustrating the magnetizing pattern of the resin magnet in the one-turn absolute angle sensor.

In this case, the resin magnet 19 is magnetized in order that the magnetic flux density $\emptyset(\theta g)$ changes in 2 poles and around a circle as shown in FIG. 6, and the first and the second. Hall element 20A, 20B are fixed to the outer circle surface of the gear case 12 with the phase delayed by 90[°] as shown in FIG. 5(B).

Figure 7:
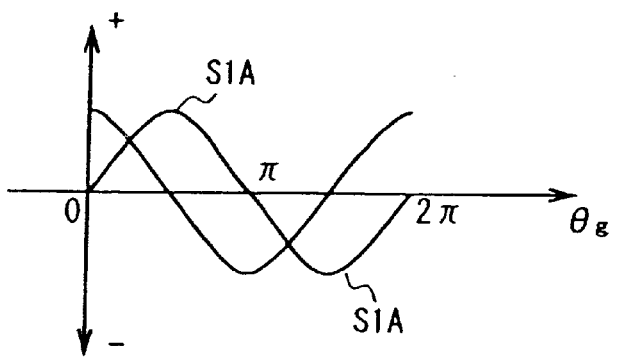
FIG. 7 is a characteristic curvilinear diagram showing a waveform of the on-turn absolute angle sensor.

Thus, in the one-turn absolute angle sensor 21, the rotation displacement of the output axis 18 will be detected as the change of magnetic flux density $\phi(\theta g)$ at the position on which the first and the second Hall elements 20A and 20B are placed according to the rotation of said output axis 18, and the detection result can be transmitted from the first and the second Hall elements 20A and 20B respectively as the wave-form first and the second one-turn absolute angle sensor signals S1A and S1B having the waveform to be given by $\sin(\theta g)$ and $\cos(\theta g)$ shown in FIG. 7.

In the case of this AC servo motor 1, in addition to such construction, a rotor axis pole angle sensor 22 to detect the pole angle of the rotor axis 6, a control substrate 23 to control the rotation angle, rotation speed and rotation torque of the output axis 6 based on a command from the upper rank controller of the outside (not shown in Fig.) and a power substrate 24 to supply driving current to each coil 11 of the motor unit 2 under the control of the control substrate 23 are stored inside of the motor case 4 of the motor unit 2.

Figure 2:
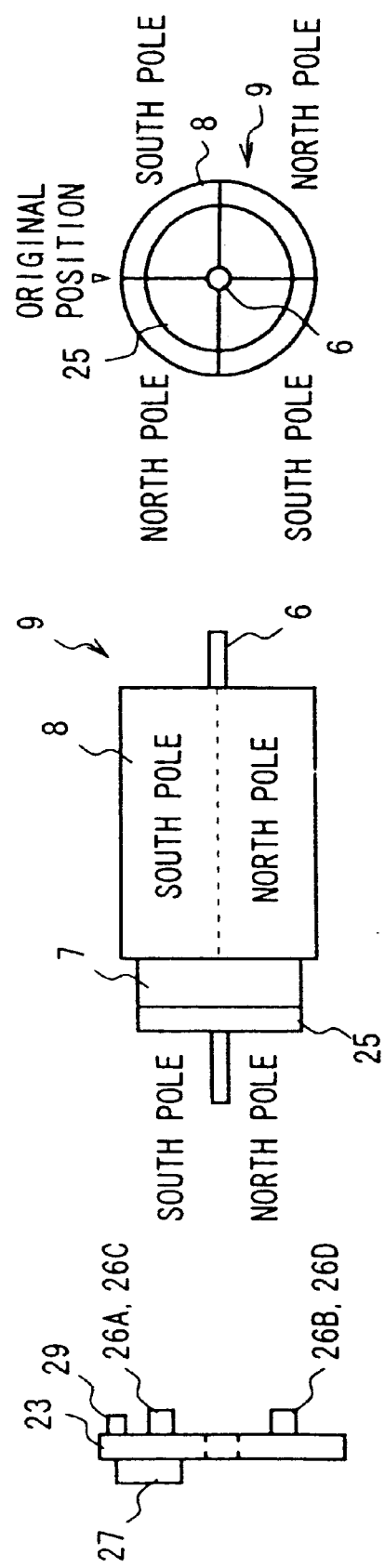
FIGS. 2(A), 2(B) and 2(C) are brief linear diagrams showing constructions of a rotor and a rotor axis pole angle sensor.

In this case, the rotor axis pole angle sensor 22 comprises a resin magnet 25 fixed to the front end surface of the rotor substrate 7 of the rotor 9 and the first~the fourth magnetic sensor (hereinafter referred to Hall elements) 26A~26D loaded on the control substrate 23. As shown in FIGS. 2(B) and (C) the resin magnet 25 is attached to 4 poles similar to the rotor magnet 8 and fixed to the rotor substrate 7 with the same phase as said rotor magnet 8.

Figure 8:
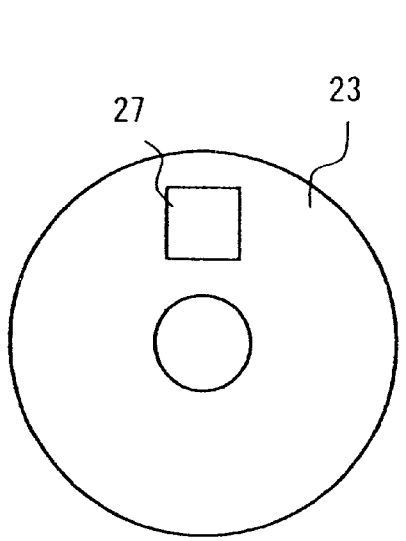
FIGS. 8(A) and 8(B) are brief linear diagrams showing the construction of a control substrate.
Figure 8:
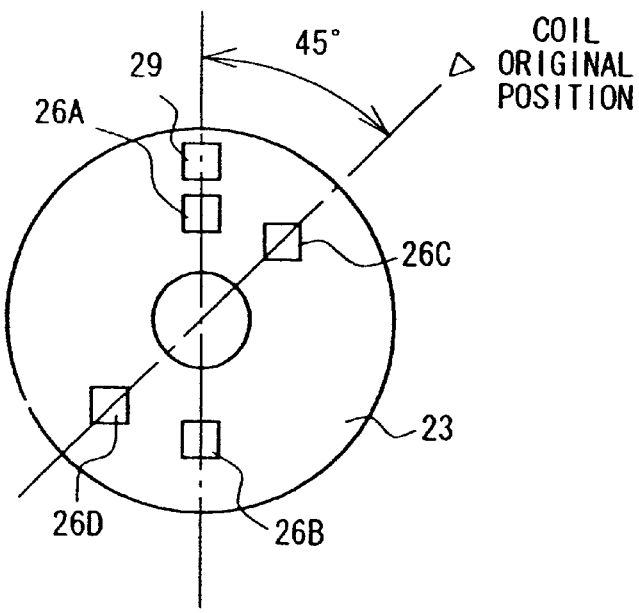

Furthermore, as shown in FIG. 8(B), the first~the fourth Hall elements 26A~26D are loaded concentrically with the rotor axis 6 on the control substrate 23 so that the first and the second Hall elements 26A and 26B are positioned opposing 180[°] and the third and the fourth Hall elements 26C and 26D are positioned phase delayed by 45[°] in the same direction as the first and the second Hall elements 26A and 26B.

Thus, in this rotor axis rotation angle sensor 22, the pole angle of the rotor axis 6 can be detected as changes of the magnetic flux density in positioning the first~the fourth Hall elements 26A~26D accompanying the resin magnet 25 revolving with said rotor axis 6.

In this connection, the pole angle of the rotor axis 6 is defined as an angle that the mechanical rotation angle of the rotor axis 6 is multiplied by a half value of the number of poles of the rotor magnet 8 (refer to EQUATION (2)). According to this embodiment, since the rotor magnet 8 is attached to 4 poles, the value of magnetic angle becomes within the range from 0 to $2\pi$.

On the other hand, as shown in FIG. 1, FIG. 2(A), FIG. 8 and FIG. 9, the control substrate 23 is loaded with a one-chip microcomputer 27 and a quartz oscillator 28 for clock generation on one surface of the ring shaped print wire plate. And on the other surface side of the control substrate 23 is loaded with the first~the fourth Hall elements 26A~26D of said rotor axis rotation angle sensor 22 and a temperature sensor 29 to detect the temperature of the resin magnet 25.

Then, in this control substrate 23, outputs of the first and the second Hall elements 26A and 26B in the rotor axis pole angle sensor 22 and outputs of the third and fourth Hall elements 26C and 26D are added up respectively via the first and the second subtractor circuits 30A and 30B and captured into the one-chip microcomputer 27 as the first and the second rotor axis pole angle sensor signals S2A and S2B. Also, the first and the second one-turn absolute angle sensor signal S1A and S1B to be supplied via a cable 31 (FIG. 1) from the one-turn absolute angle sensor 21 (FIG. 1, FIG. 5(C)) can be captured into the one-chip microcomputer 27.

Furthermore, the control substrate 23 is connected to the upper rank controller through the second cable 32 (FIG. 1) having one common parallel communication line, two RS-232C serial communication line and three synchronous serial communication line. Accordingly, the one-chip microcomputer 27 inputs the driving voltage through this second cable and is adapted to be able to communicate with the upper rank controller.

Then, the one-chip microcomputer 27 calculates the current value of the driving current to be applied to each coil 11 of the U-phase, V-phase and W-phase respectively (hereinafter referred to as the first~the third current command values respectively) based on the specified values of the rotation angle, rotational speed or the rotation torque of the output axis 18 (FIG. 1) to be given from the upper rank (hereinafter referred to as the specified rotation angle, specified rotational speed and the specified rotation torque), the first and the second one-turn absolute angle sensor signals S1A, S1B, the first and the second rotor axis pole angle sensor signals S2A, S2B, and the first the third driving current detection signals S3A~S3B to be supplied from the power substrate 24 (this will be described later), and the resultant first~third current command values will be transmitted to the power substrate 24 via the third cable 33.

Figure 10:
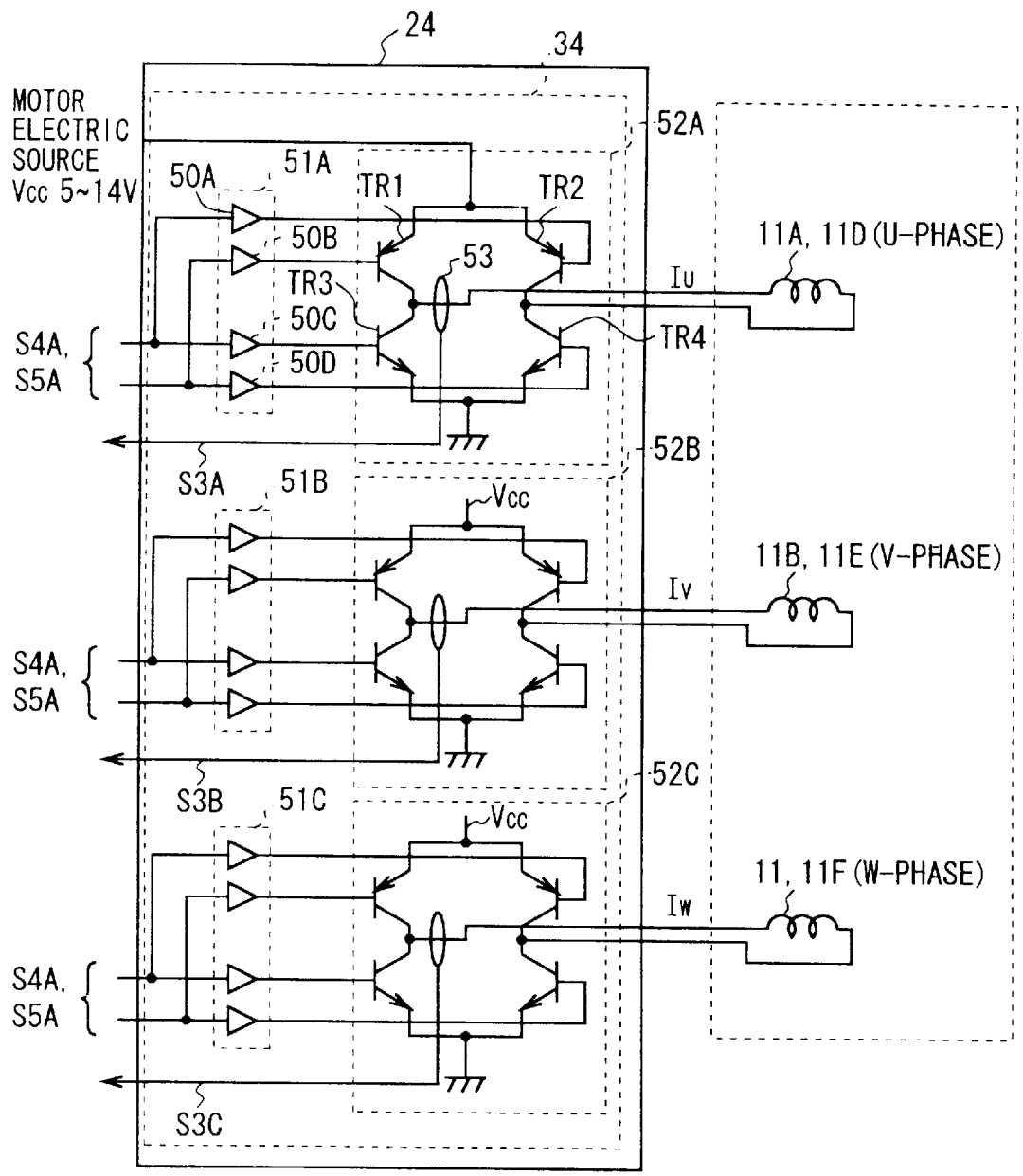
FIG. 10 is a schematic circuit diagram showing the construction of a power substrate.

As shown in FIG. 1, FIGS. 4(B) and(C), the power substrate 24 comprises the plural number of power transistor chips 35 forming the coil driving block 34 loaded on one surface of the ring-shaped print wiring plate shown in FIG. 10.

The coil driving block 34 rotates the rotor 9 of the motor unit 2 by applying the driving current of the corresponding current value to each coil 11 of the U-phase, V-phase and W-phase of the motor unit 2 based on the first~the third current command values to be given from the one-chip microcomputer 27 of the control substrate 23.

Furthermore, at this point, this coil driving block 34 detects the current value of the driving current applied respectively to each coil 11 of the U-phase, V-phase and W-phase and outputs the resultant to the control substrate 23 via the third cable 33 (FIG. 1) as the first~third driving current detection signals S3A~S3C.

With this arrangement, in this AC servo motor 1, the control circuit comprising the one-chip microcomputer 27 of the control substrate 23 and the coil driving block 34 of the power substrate 23, drives the motor unit 2 corresponding to the specified rotation angle, the specified rotational speed or the specified rotation torque given from the upper rank controller.

(2) Construction of One-Chip Microcomputer 27 and Coil Driving Block 34

Figure 11:
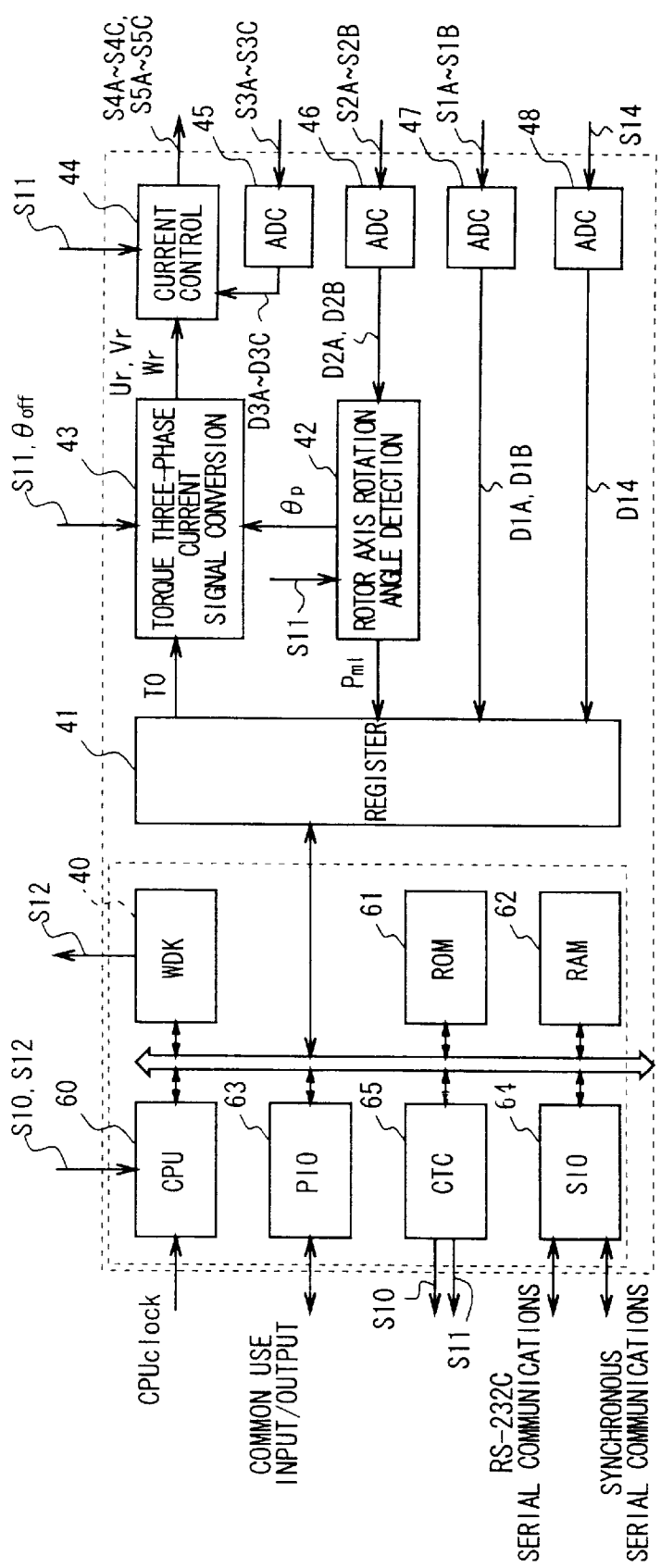
FIG. 11 is a block diagram showing the construction of one-chip microcomputer.

At this point, as shown in FIG. 11, the one-chip microcomputer 27 comprises a calculation processing block 40, a resistor 41, a rotor axis rotation angle detection processing block 42, a torque three-phase current signal conversion processing block 43, a current control processing block 44, and the first~fourth analog/digital conversion circuits 45~48.

Moreover, in this one-chip microcomputer 27, the first and the second one-turn absolute angle sensor signals S1A, S1B to be supplied from the one-turn absolute angle sensor 21 (FIG. 1, FIG. 5(C)) will be converted to digital signals at the third analog/digital conversion circuit 47, and the resultant first and second one-turn absolute angle sensor data D1A and D1B will be stored in the resistor 41.

Furthermore, in this one-chip microcomputer 27, the first and the second rotor axis pole angle sensor signals S2A and S2B based on the output of the rotor axis pole angle sensor 22 given from the first and the second subtraction circuits 30A, 30B (FIG. 9) will be converted to digital signals at the second analog/digital conversion circuit 46 and the resulting first and second rotor axis pole angle sensor data D2A and D2B will be supplied into the rotor axis rotation angle detection processing block 42.

The rotor axis rotation angle detection processing block 42 detects the pole rotation angle of the rotor axis 6 (hereinafter referred to as the rotor axis pole rotation angle) Pm1 and the pole angle θp based on the first and the second rotor axis pole angle sensor data D2A and D2B to be supplied and as well as storing-the rotor axis rotation angle Pm1 in the resistor 41, transmits the pole angle θp to the torque three-phase current signal conversion processing block 43.

In this connection, the pole rotation angle of the rotor axis 6 (rotor axis pole rotation angle Pm1) is defined as an angle that makes pole change by a pair of N-pole and S-pole adjacent to the resin magnet 25 to be detected by the first~the fourth Hall elements 26A~26D with the rotation of the rotor axis 6 as one cycle (0~2π). According to this embodiment, since the resin magnet 25 is magnetized to 4 poles, the value of the rotor axis pole rotation angle Pm1 becomes within the range from 0 to 4π.

Then, the calculation processing block 40 calculates the rotation torque targeted (hereinafter referred to target rotation torque) T0 based on the first and the second one-turn absolute angle sensor data D1A and D1B and the rotor axis pole rotation angle Pm1 stored in the resistor 41, and the specified rotation angle, the specified rotational speed or the specified rotation torque given from the upper rank controller, and stores the calculation result in the resistor 41.

The target torque T0 stored in this resistor 41 will be read out by the torque three-phase current signal conversion processing block 43. And the torque three-phase current signal conversion processing block 43 calculates the first~the third current command values Ur, Vr, Wr showing the current values of the driving current to be applied to each coil of the U-phase, V-phase and W-phase in the motor unit 2 respectively based on the target torque T0 and the pole angle θp of the rotor axis 6 to be given from the rotor axis rotation angle detection processing block 42 and transmits these to the current control processing block 44.

Furthermore, at this point, the first~the third driving current detection data D3A, D3B obtained by converting the first~the third driving current detection signal S3A~S3B given from the power substrate 24 will be supplied into the current control processing block 44 from the first analog/digital conversion circuit 45.

Thus, the current control processing block 44, after applying the prescribed signal processing including compensation processing to the voltage changes with respect to the first~the third current command values Ur, Vr, Wr based on the first~the third current command values Ur, Vr, Wr and the first~the third driving current detection data D3A, D3B, conducts the PWM (pulse width modulation) to these; and transmits the resulting first third PWM signals S4A~S4C to the coil driving block 34 of the power substrate 24 via the third cable 33.

In this connection, in this third cable 33, two lines each are provided for the first third PWM signals S4A~S4C. And when driving the output axis 18 (FIG. 1) forward, the current control processing block 44 transmits the first~third PWM signals S4A~S4C to the coil driving block of the power substrate 24 via the first line respectively. And at the same time, it transmits the logical "0" level signal in the first third PWM signals S4A~S4C (hereinafter referred to as the first~third reference signal) S5A~S5C to the coil driving block 34 of the power substrate 24 via the other second line respectively.

Furthermore, when reverse driving the output axis 18, the current control processing block 44 transmits the first~the third reference signal S5A~S5C to the coil driving block 34 of the power substrate 24 via the first line respectively, as well as transmitting the first~the third PWM signals S4A~S4C to the coil driving block 34 of the power substrate 24 via the second line respectively.

As shown in FIG. 10, the coil driving block 34 is comprised of the similarly constructed first~the third gate drive circuits 51A~51C each having 4 amplifiers 50A~50C and the similarly constructed first~the third inverter circuits 52A~52C each having 2 PNP type transistors TR1m TR2 and 3 NPN type transistors TR3, TR4 corresponding respectively to each coil 11 of the U-phase, V-phase and W-phase.

In this coil driving block 34, the first lines of U-phase, V-phase and W-phase are connected to the base of the second PNP type transistor TR2 and the base of the first NPN type transistor TR3 of the corresponding first~third inverter circuits 52A~52C via the first and the third amplifiers 50A, 50C of the corresponding first~the third gate drive circuits 51A~51C respectively, and each of the second lines of U-phase, V-phase and W-phase are connected to the base of the second PNP type transistor TR2 and the base of the first NPN type transistor TR4 of the corresponding first~third inverter circuits 52A~52C via the second and the fourth amplifiers 50B, 50D of the corresponding first~third gate drive circuits 52A~52C respectively.

Furthermore, in this coil driving block 34, each coil 11 of the U-phase, V-phase, W-phase of the motor unit 2 is connected respectively between the midpoint at which the collector of the first PNP type transistor TR1 and the collector of the first NPN type transistor TR3 are connected and the midpoint at which the collector of the second PNP type transistor TR2 and the collector of the second NPN type transistor TR4 are connected in the corresponding first~the third inverter circuit 52A~52C.

With this arrangement, in this coil driving block 34, the first the third PWM signals S4A~S4C to be supplied via the first or the second line in each phase, U-phase, V-phase and W-phase, will be converted to analog waveform driving currents Iu, Iv, Iw at the corresponding first~the third inverter circuits 52A~52C and these can be applied respectively to each coil 11 of the corresponding U-phase, V-phase and W-phase.

Moreover, in this coil driving block 34, the magnitude of driving current Iu, Iv, Iw to be supplied to each coil 11 of the U-phase, V-phase and W-phase will be detected by the current sensor 53 formed of coil provided respectively in the first~the third inverter circuit 52A~52C. And the detection result will be transmitted to the first analog/digital conversion circuit 45 of the one-chip microcomputer 27 of the control substrate 23 (FIG. 11) as the first~the third driving current detection signals S3A~S3C.

(3) Detailed Construction of Each Processing Block of the One-Chip Microcomputer 27

At this point, the construction of the calculation processing block 40, the rotor axis rotation angle detection processing block 42, the torque three-phase current signal conversion processing block 43 and the current control processing block 44 of the one-chip microcomputer 27 will be described in detail in the following paragraphs.

(3-1) Detailed Construction of Calculation Processing Block 40

As is clear from FIG. 11, the calculation processing block 40 comprises a CPU (central processing unit) 60, a ROM (read only memory) 61 in which various programs are stored, a RAM (random access memory) 62 as the work memory of CPU 60, a parallel communication input/output circuit 63 compatible with common parallel communications, a serial communication input/output circuit 64 formed of an input/output interface circuit between the upper rank controller, a counter timer control circuit 65 for generating 1 (ms) cycle servo interrupt signal S10 for servo interrupt and 50 ($\mu$m) cycle (that is PWM cycle) PWM pulse signal S11, and a watch dog signal generation circuit 66 for generating watch dog signal S12 formed of standard signal with the predetermined cycle more than 1 (ms) cycle, that is for the CPU 60 to judge whether the servo interrupt signal S10 is generated correctly or not from the counter timer control circuit 65 connected each other via the CPU bus 67.

In this case, when the source voltage (5 $\{V\}$) is supplied from the upper rank controller via the serial communication input/output circuit 64, the CPU 60 executes the starting processing such as various initial values and parameter setting processings to the parallel communication input/output circuit 63, the serial communication input/output circuit 64, the counter timer control circuit 65, the rotor axis rotation angle detection processing block 42, the torque three-phase current signal conversion processing block 43, and the current control processing block 44 based on the initial program stored in the ROM 61.

Furthermore, as a result, the CPU 60 executes the motor rotation control calculation processing to generate the target rotation torque T0, the phase advance control processing, the temperature compensation control processing and the serial communication control processing in 1 $\{ms\}$ in time division based on the servo interrupt signal S10 given from the counter timer control circuit 65 and the corresponding program stored in the ROM 61. In this connection, the processing of CPU 60 at the time of each processing mode will be described later.

At this point the construction of a serial communication input/output circuit 64 will be described. This serial communication input/output circuit 64 is so constructed that it can be compatible with both the RS-232C serial communication system and the synchronous serial communication system.

In practice, when communicating using the RS-232C serial communication system for example, the serial communication input/output circuit 64 communicates by transmitting TXD signal as the transmitting signal and receiving RXD signal as the receiving signal using 2 lines. At this point, communications with the upper rank controller will be conducted using the data format, i.e., 9600 (bit/sec) data transfer speed, transfer data length 8 bit, stop bit 1-bit and start bit 1-bit and the data structure without parity bit.

Furthermore, when communicating according to the synchronous serial communication system, the serial communication input/output circuit 64 conducts the communications by transmitting/receiving TXD signal as a transmitting signal and the RXD signal as a receiving signal and the synchronous clock signal using 3 lines. At this point, communications with the upper rank controller will be conducted according to the transfer format of the data structure, at the data transfer speed of 800 or 1500 (Kbit/sec), synchronous character data of 2 byte, transfer data length of 1 byte (8 bit) to several tens byte.

Then, according to this communications system, since the data communications can be conducted at high speed, the command can be given in real time. And in the case of transferring N-byte data, the structure of a frame of data becomes such as {synchronous character 1+synchronous character 2+data 1 (8 bit)+data 2 (8 bit)+ . . . +data N (8 bit)+synchronous character 1+synchronous character 2}.

(3-2) Detailed Construction of Rotor Axis Rotation Angle Detection Processing Block 42

Next, the construction of rotor axis rotation angle detection processing block 42 will be described in detail. In this connection, firstly the rotor axis pole angle sensor 22 (FIG. 1) will be explained.

Figure 12:
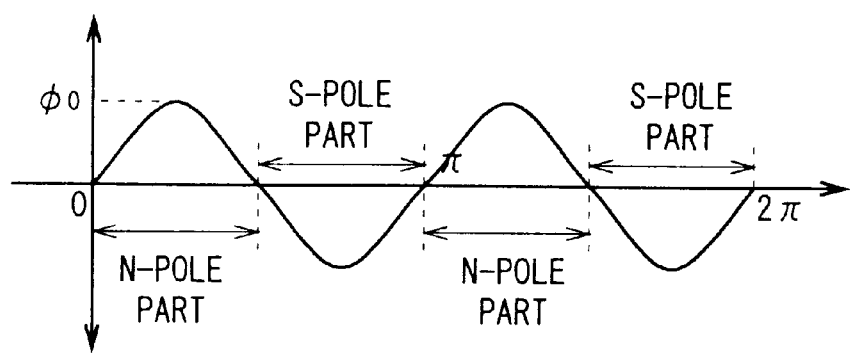
FIG. 12 is a characteristic curvilinear diagram illustrating the magnetizing pattern of the resin magnet in the rotor axis pole angle sensor.

At first, in the rotor axis pole angle sensor 22, a resin magnet 25 is magnetized to the same poles as the rotor magnet 8 and fixed to the rotor substrate 7 in phase with the rotor magnet 8. And the magnetizing pattern of the resin magnet 25 is set so that the magnetic flux density $\phi(\theta p)$ becomes as follows and as shown in FIG. 12:

$$\phi(\theta p) = \phi 0 \times \sin \theta p \, [T] \quad (1)$$

Where the maximum magnetic flux density of the magnetizing pattern of the resin magnet 25 is $\phi 0$.

Here, $\theta p$ is the pole angle of the rotor axis 6. And the relationship between this pole angle $\theta p$ and the mechanical rotation angle of the rotor axis 6 $\theta m$ can be expressed as the following EQUATION:

$$\theta p = \theta m \times \frac{P}{2} \, [\text{rad}] \quad (2)$$

Assuming that the number of poles to be P in the above EQUATION, (there are 4 according to the present embodiment).

On the other hand, the first~the fourth Hall elements 26A~26D of the rotor axis pole angle sensor 22 are placed on the positions to be given by the following EQUATIONS:

$$A0 \times \sin \theta 0 \quad (3)$$

$$A0 \times \sin(\theta 0 + \pi) \quad (4)$$

$$A0 \times \sin\left(\theta 0 + \frac{\pi}{p}\right) \text{ or} \quad (5)$$

$$A0 \times \sin\left(\theta 0 + \frac{\pi}{p} + \frac{2\pi}{p}\right)$$

$$A0 \times \sin\left(\theta 0 + \frac{\pi}{p} + \pi\right) \text{ or} \quad (6)$$

$$A0 \times \sin\left(\theta 0 + \frac{\pi}{p} + \frac{2\pi}{p} + \pi\right)$$

The first~the fourth Hall elements 26A~26D of the rotor axis pole angle sensor 22 are loaded on the control substrate 23 facing to the resin magnet 25 and concentrically with the rotor axis 6 as described above in FIG. 8(B).

In this connection, in EQUATIONS (3)~(6), $\theta 0$ shows the coordinate position making the position of one coil 11 as an original point. In the following the pole center of the coil 11A of the U-phase to be $\theta 0 = 0$ (refer to FIG. 4(A)). Furthermore, the adjacent coils 11B, 11F their coordinate positions $\theta 0$ can be given by the following EQUATION to be V-phase.

$$\theta 0 = \frac{2\pi}{Ps} \quad (7)$$

The coils 11F and 11C of which the coordinate positions $\theta 0$ can be given by the following EQUATION to be W-phase.

$$\theta 0 = -\frac{2\pi}{Ps} \quad (8)$$

The coil 11D opposing 180(°) to the coil 11A having its pole center is $\theta 0 = 0$ becomes U-phase.

In this connection, the relation between the number of poles Ps of the stator iron core 10 (FIG. 3) and the number of poles of the resin magnet 25 can be given as follows:

$$Ps = \frac{P}{2} \times 3 \quad (9)$$

The number of poles Ps of the stator iron core 10 is 4 according to this embodiment.

Then, outpts of the first~the fourth Hall elements 26A~26D, Sh1, Sh2, Sh3, Sh4, positioned as described above become as follows:

Where the sensor sensitivity coefficient of the first~the fourth Hall elements 26A~26D to be G0, the rotation angle of the rotor axis 6 to be $\theta m$.

$$Sh1 = G0 \times \phi 0 \times \sin\left(\theta m \times \frac{P}{2}\right) \quad (10)$$

$$Sh2 = G0 \times \phi 0 \times \sin\left(\theta m \times \frac{P}{2}\right) \quad (11)$$

$$Sh3 = G0 \times \phi 0 \times \cos\left(\theta m \times \frac{P}{2}\right) \quad (12)$$

$$Sh4 = G0 \times \phi 0 \times \cos\left(\theta m \times \frac{P}{2}\right) \quad (13)$$

Accordingly, when the rotor axis 6 makes a full turn, signal levels of outputs Sh1, Sh2, Sh3, Sh4 of the first~the fourth Hall elements 26A~26D change corresponding to the number of poles P of the resin magnet 25.

However, in practice since error occurs in right angles between the rotor axis 6 and the sensor face of the first~the fourth Hall elements 26A~26D and also error occurs in the concentric degree, actual outputs of the first~the fourth Hall elements 26A~26D become as follows:

$$Sh1' = G0 \times (\phi0 + \phi e1) \times \sin\left(\theta m \times \frac{P}{2} + \theta e1\right) \quad (14)$$

$$Sh2' = G0 \times (\phi0 - \phi e1) \times \sin\left(\theta m \times \frac{P}{2} - \theta e1\right) \quad (15)$$

$$Sh3' = G0 \times (\phi0 + \phi e2) \times \cos\left(\theta m \times \frac{P}{2} - \theta e2\right) \quad (16)$$

$$Sh4' = G0 \times (\phi0 - \phi e2) \times \cos\left(\theta m \times \frac{P}{2} - \theta e2\right) \quad (17)$$

Provided that these errors to be $\phi e1$, $\phi e2$, $\theta e1$, $\theta e2$.

Figure 9:
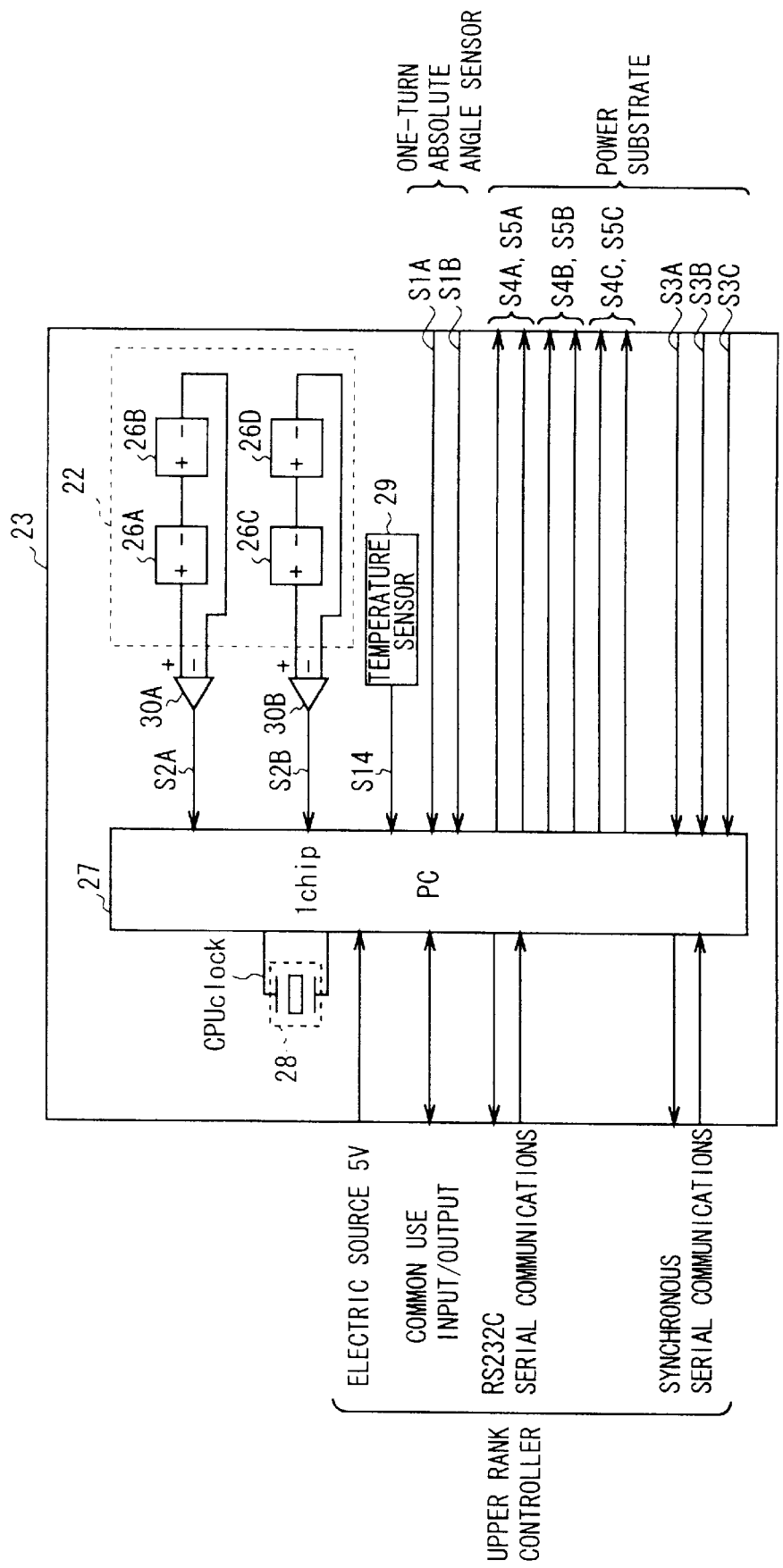
FIG. 9 is a block diagram showing the construction of a control substrate.

Moreover, the first sensor signal Sh12 to which each output Sh1', Sh2' of the first and the second Hall elements 26A, 26B is added (in this embodiment, it corresponds to the first rotor axis pole angle sensor signal S2A in FIG. 9) and the second sensor signal Sh34 to which each output Sh3', Sh4' of the third and the fourth Hall elements 26C, 26D is added (according to the present embodiment, it corresponds to the second rotor axis pole angle sensor signal S2B in FIG. 9) can be expressed as follows assuming that $\theta e1$, $\theta e2$ are sufficiently small:

$$Sh12 = Sh1' + Sh2' = G0 \times \phi0 \times \sin\left(\theta m \times \frac{P}{2}\right) \quad (18)$$

$$Sh34 = Sh3' + Sh4' = G0 \times \phi0 \times \cos\left(\theta m \times \frac{P}{2}\right) \quad (19)$$

Figure 13:
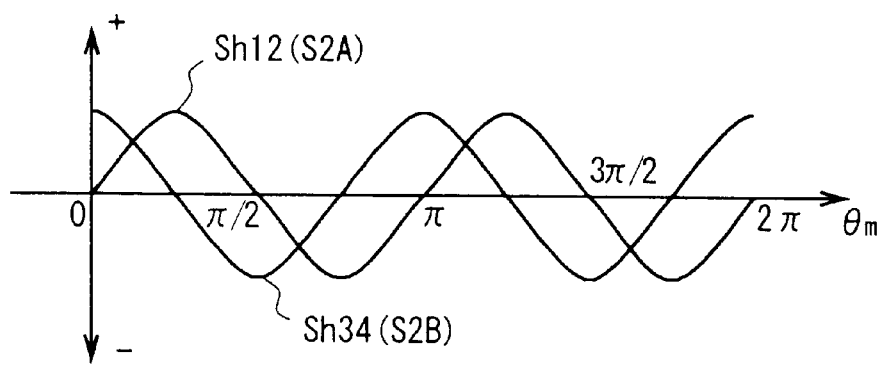
FIG. 13 is a characteristic curvilinear diagram showing waveforms of the first and the second sensor signals (the first and the second rotor axis pole angle sensor signals).

Waveforms of these first and the second sensor signals Sh12 and Sh34 are shown in FIG. 13.

Then, based on these first and second sensor signals Sh12 and Sh34, the pole angle $\theta p$ of the rotor axis 6 and the rotor axis pole rotational speed Pm1 can be obtained according to the procedure that follows.

More specifically, firstly, let the initial value to be 0, and set the pole angle calculation value $\theta x$.

$$E\theta x = Sh12 \times \cos \theta x - Sh34 \times \sin \theta x = G0 \times \phi 0 \times \sin \theta p \times \cos \theta x - G0 \times \phi 0 \times \cos \theta p \times \sin \theta x = G0 \times \phi 0 \times \sin(\theta p - \theta x) \quad (20)$$

Calculate the above formula.

And in the case where $E\theta x=0$ does not exit, $\theta x$ will be calculated from the following EQUATION:

$$\theta x = \theta x + E\theta x \times Krp + \int (E\theta x \times Kri) dt \quad (21)$$

Here, Krp shows the proportional gain and Kri shows the integral gain. And these are both positive constants.

Using this calculated $\theta x$, calculate again EQUATION (20), and repeat this till it becomes $E\theta x=0$. As a result, $E\theta x$ converges to 0 value. At this point, $\theta x$ can be obtained as the following EQUATION:

$$\theta x = \theta p + 2\pi \times N \quad (22)$$

And this corresponds to the rotor axis pole rotation angle Pm1.

Thus, when the rotor axis pole rotation angle Pm1 is obtained, the pole angle $\theta p$ can be also obtained based on the rotor axis pole rotation angle Pm1 since the following relation exists between the rotor axis pole rotation angle Pm1 and the pole angle $\theta p$.

$$\theta p = Pm131 \; 2\pi \times Nx \quad (23)$$

In this connection, Nx shows integer more than 0 in EQUATION (23).

Figure 14:
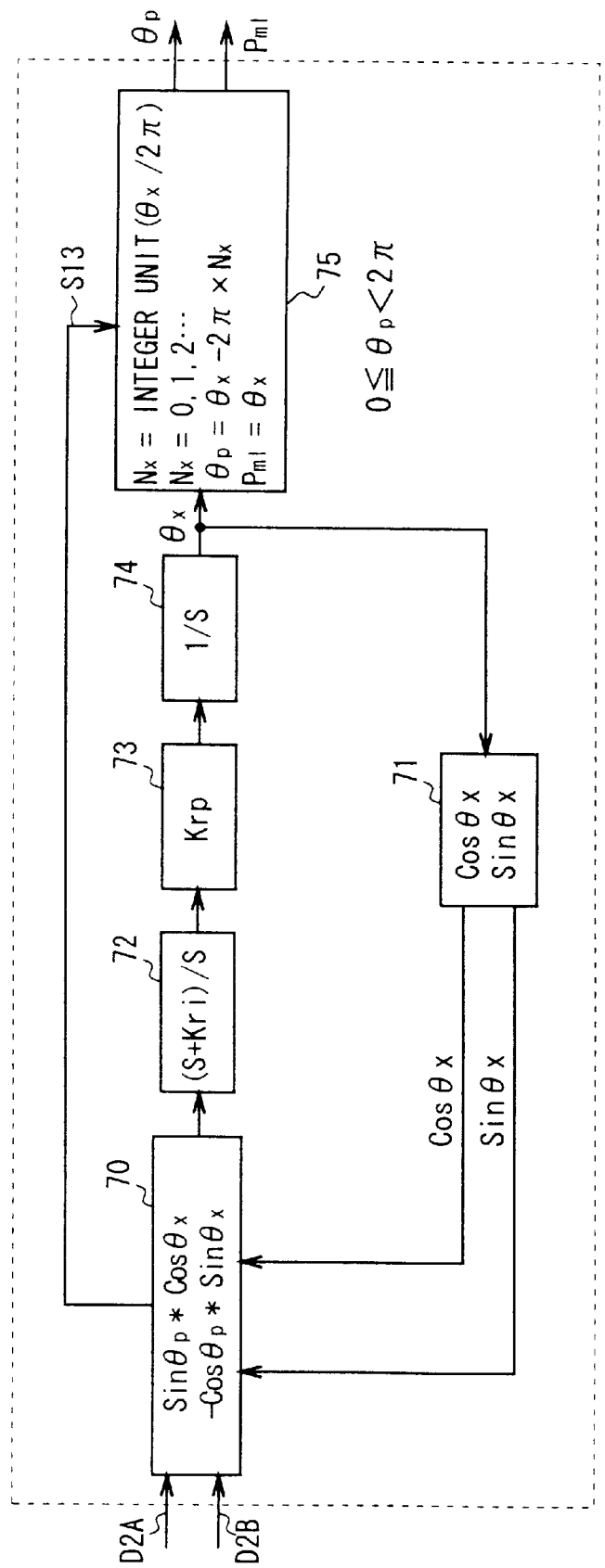
FIG. 14 is a block diagram showing the construction of a rotor axis rotation angle detection processing block.

Based on such principle, the rotor axis rotation angle detection processing block 42 is constituted as shown in FIG. 14. And in this rotor axis rotation angle detection processing block 42, the first and the second rotor axis pole angle sensor data D2A and D2B to be supplied from the rotor axis pole angle sensor 22 via the second analog/digital conversion circuit 46 will be supplied into the calculator 70.

At this point, the sinusoidal value (sin $\theta x$) and the cosine value (cos $\theta x$) of the pole angle calculation value $\theta x$ calculated from the function converter 71 will be supplied to the calculator 70.

Thus, the calculator 70, by computing EQUATION (20) based on the first and the second rotor axis pole angle sensor data D2A, D2B, and the sinusoidal value and the cosine value of the pole angle calculation value $\theta x$ calculated in advance, calculates the pole angle $\theta p$ obtained from EQUATION (2) and error between $\theta x$ at that time, and transmits the calculation result to the first multiplier 72.

Then, at the first multiplier 72, the calculation result will be multiplied by the integer gain to be given by the following EQUATION (provided that S is Laplace operator):

$$\frac{S \times Kri}{S} \quad (24)$$

Then, at the second multiplier 73, it is multiplied by the proportional gain Krp, and at the adder 74, it is multiplied by 1/S (S is Laplace operator).

As a result, the pole angle calculation value $\theta x$ is put out from the adder 74 and transmitted to the function converter 71 and given to the pole angle calculator 75.

Thus, the pole angle calculator 75 stores the value of the pole angle calculated value $\theta x$ in the resistor 41 (FIG. 11) as the rotor axis pole angle Pm1.

Furthermore, at this point, the pole angle calculator 75 obtains the value of $\theta p$ within the range from 0 to $2\pi$ by increasing the value of Nx in EQUATION (23) from 0 in order, and outputs this to the torque three-phase current signal conversion processing block 43 as the pole angle $\theta p$.

With this arrangement, in the rotor axis rotation angle detection processing block 42, the pole angle $\theta p$ and the rotor axis pole rotation angle Pm1 will be detected based on the first and the second rotor axis pole angle sensor data D2A and D2B.

In this connection, in the rotor axis rotation angle detection processing block 42, the calculation processing of the pole angle $\theta p$ and the rotor axis pole rotation angle Pm1 will be conducted based on the PWM pulse signal S11 to be supplied from the counter timer control circuit 65 of the calculation processing block 40.

Accordingly, the pole angle $\theta p$ and the rotor axis pole rotation angle Pm1 to be put out from the rotor axis rotation angle detection processing block 42 will be renewed per 50 (us) that is a cycle of the PWM pulse signal S11.

(3-3) Detailed Construction of Torque Three-Phase Current Signal Conversion Processing Block 43

Figure 15:
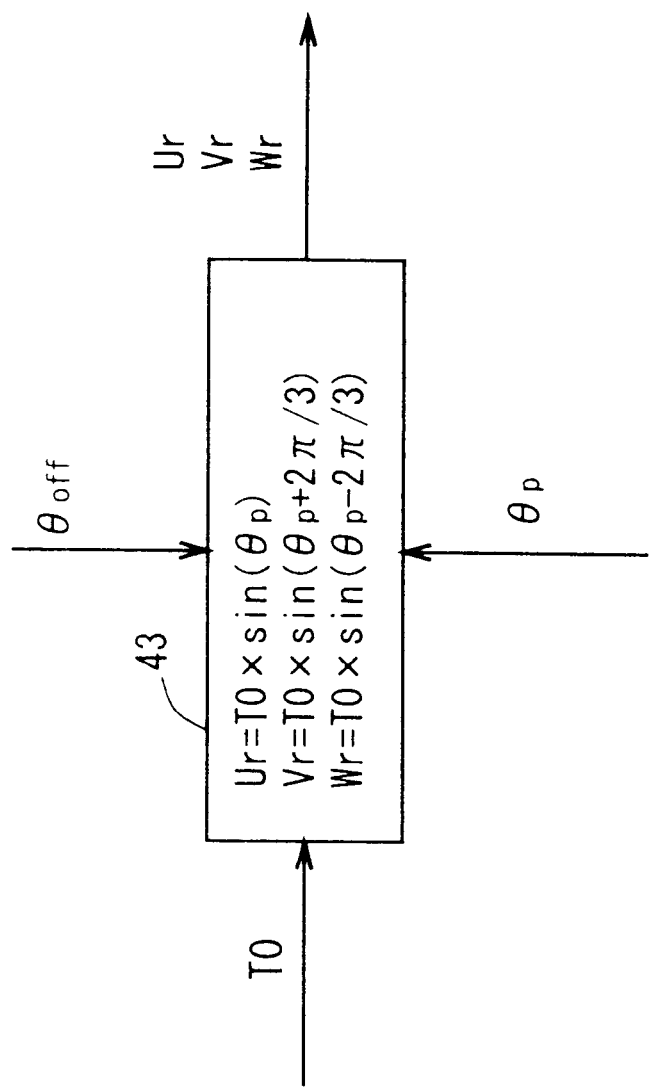
FIG. 15 is a block diagram showing the construction of a torque three-phase current signal conversion processing block.

As shown in FIG. 15, the torque three-phase current signal conversion processing block 43 reads out the target rotation torque T0 stored in the resistor 41 (FIG. 11) at the PWM pulse cycle (50 ($\mu$s) cycle) to be described later, and based on said target torque T0 and the pole angle $\theta p$ to be given from the rotor axis rotation angle detection processing block 42 (FIG. 14), calculates the first~the third current command values Ur, Vr, Wr by calculating the following EQUATION:

$$Iu = T0 \times K0 \times \sin \theta p \tag{25}$$

$$Iv = T0 \times K0 \times \sin\left(\theta p + \frac{2\pi}{3}\right) = -(Iu + Iw) \tag{26}$$

$$Iw = T0 \times K0 \times \sin\left(\theta p - \frac{2\pi}{3}\right) \tag{27}$$

Then, the torque three-phase current signal conversion processing block 43 transmits these first~third current command values Ur, Vr, and Wr to the current control processing block 44 (FIG. 11).

In this connection, the calculation processing of these first~the third current command values Ur, Vr and Wr will be conducted based on the PWM pulse signal S11 to be given from the counter timer control circuit 65 of the calculation processing block 40. Accordingly, these first~third current command values Ur, Vr and Wr will be also renewed per 50 ($\mu$s), that is the cycle of the PWM pulse signal S11.

(3-4) Detailed Construction of Current Control Processing Block 44

Figure 16:
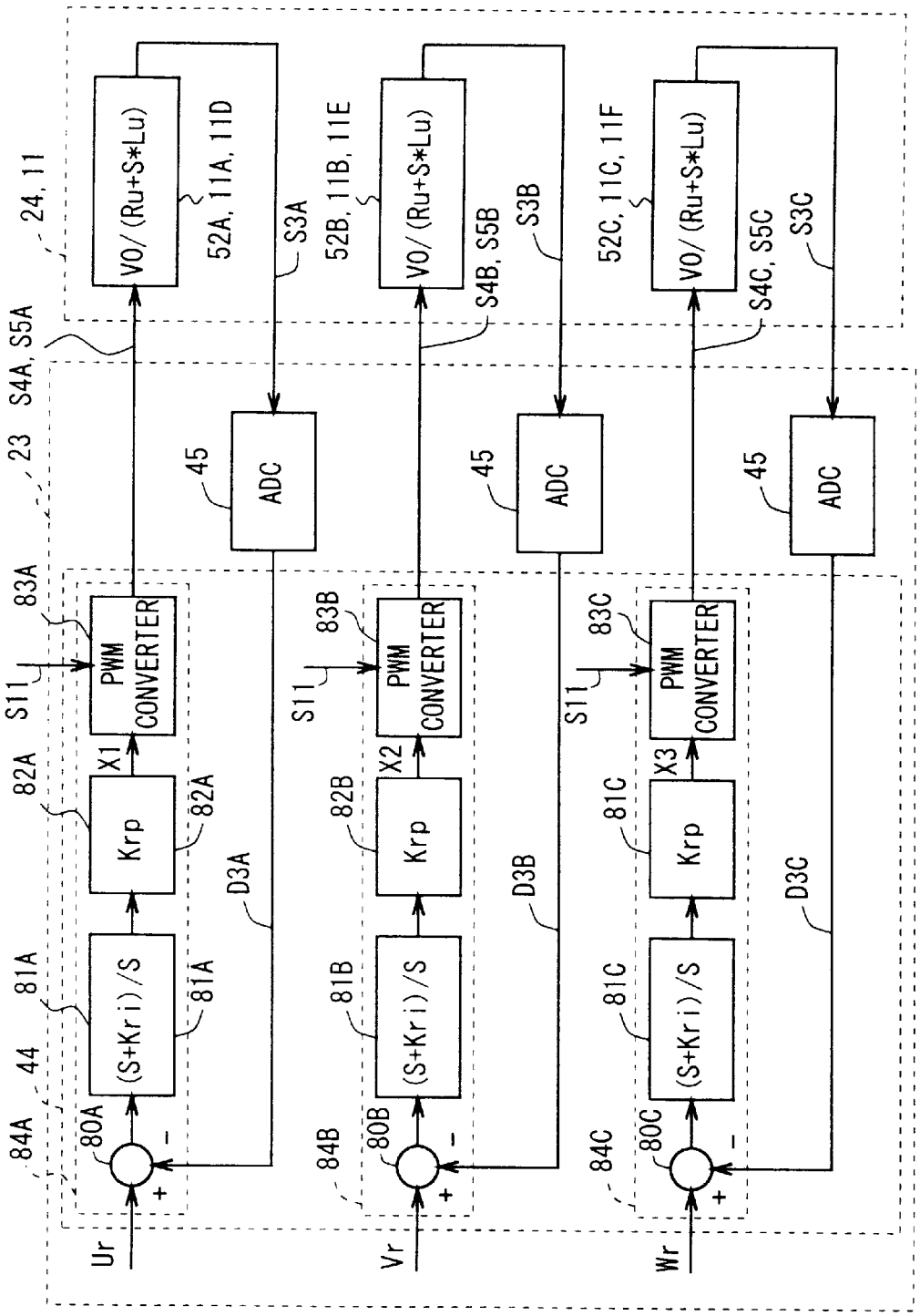
FIG. 16 is a block diagram showing the construction of a current control processing block.

On the other hand, in the current control processing block 44, as shown in FIG. 16, the first~the third signal processing systems 84A~84C comprised of subtraction circuits 80A~80C, the first and the second multiplier circuits 81A~81C, 82A~82C and PWM converter 83A~83C are provided corresponding respectively to each coil 11 of the U-phase, V-phase and W-phase.

Then, in this current control processing block 44, by applying the predetermined signal processing including the compensation processing of the voltage change, the first~third PWM signals S4A~S4C and the first~third reference signals S5A~S5C can be formed in the first~the third signal processing systems 84A~84C based on the first~the third current command value Ur, Vr, Wr to be given from the torque three-phase signal conversion processing block 43 (FIG. 15) and the first~the third driving current detection signals S3A~S3C to be supplied from the power substrate 24.

In practice, in the first~the third signal processing systems 84A~84C, errors between the first~the third current command values Ur, Vr, Wr and the first~the third driving current detection signals S3A~S3C to be supplied will be detected at the subtraction circuits 80A~80C, and the detection result will be transmitted to the first multiplication circuits 81A~81C.

Then, in the first~the third signal processing systems 84A~84C, in order to converge the error to 0, the error will be multiplied by the integer gain to be given by the following EQUATION at each first multiplier circuits 81A~81C, where the Laplace operator to be S.

$$\frac{S + Kvi}{S} \tag{28}$$

Then, at the second multiplier circuits 82A~82C, the multiplication result will be multiplied by the proportional gain Krp.

And the resulting values X1, X2, X3 to be transmitted from each second multiplier circuit 82A~82C will be given as follows:

$$X1 = (Ur - Iv) \times \left(\frac{S + Kri}{S}\right) \times Krp \tag{29}$$

$$X2 = (Vr - Iu) \times \left(\frac{S + Kri}{S}\right) \times Krp \tag{30}$$

$$X3 = (Wr - Iw) \times \left(\frac{S + Kri}{S}\right) \times Krp \tag{31}$$

These values X1, X2, X3 are current values of the driving current to be applied actually to each coil 11 of the U-phase, V-phase and W-phase respectively, and these values X1, X2, W3 are supplied to the corresponding PWM converters 83A~83C respectively.

Then, controlling the pulse width of the pulse having 50 ($\mu$s) cycle, the PWM converters 83A~83C generate the first~the third PWM signals S4A~S4C and the first~the third reference signals S5A~S5C based on values X1, X2 and X3 to be supplied respectively.

Figure 17:
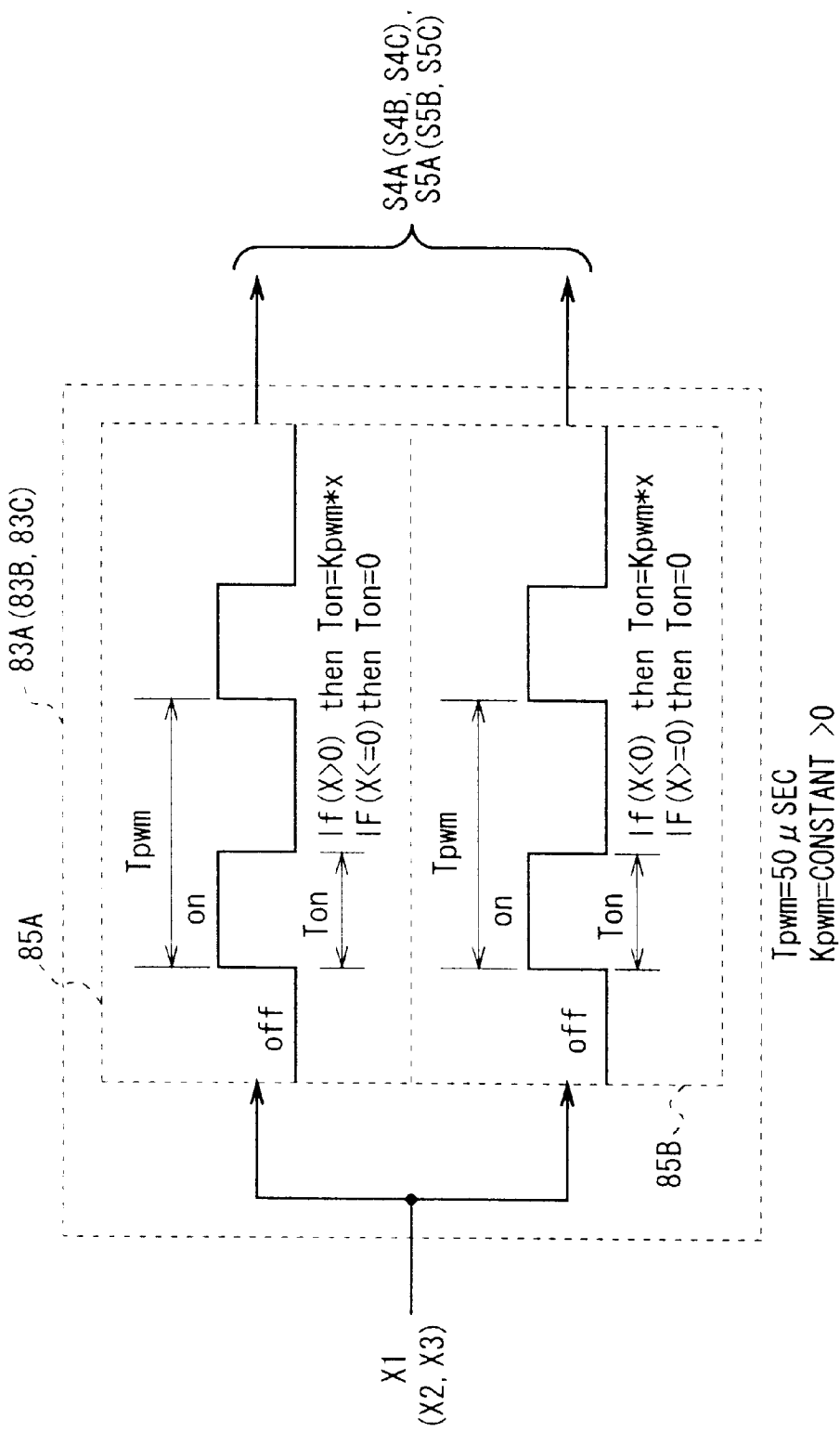
FIG. 17 is a brief linear diagram illustrating the processing of a PWM converter.

In practice, as shown in FIG. 17, each PWM converter 83A~83C sets values X1, X2, X3 to be supplied respectively in the internal register. And when the values X1, X2, X3 are positive values, each PWM converter 83A~83C sets said value X1, X2, X3 to the down counter (not shown in Fig.) in the PWM pulse signal generation circuit 85A at each starting edge of the 50 ($\mu$s) cycle PWM pulse signal S11 to be given from the counter timer control circuit 65 of the calculation processing block 40.

Then, this down counter, decreasing the counter value in every starting edge of the CPU clock (0.1 ($\mu$s)) of the calculation processing block 40 (FIG. 11), stops at 0 value. Accordingly, the output of the first PWM pulse signal generation circuit 85A becomes the logical "1" level till the count value of down counter becomes 0 value and becomes the logical "0" level after the counter value becomes 0 value.

Furthermore, values X1, X2, X3 stored again in the register at the rising edge of the succeeding PWM pulse signal S11 will be set to the down counter of the first PWM pulse signal generation circuit 85A again and the processing described above will be repeated.

Accordingly, the first~the third PWM signals S4A~S4C with the fixed pulse width Ton corresponding to the values X1, X2, X3 are transmitted from the first PWM pulse signal generation circuit 85A till the values X1, X2, X3 to be stored in the register would be renewed, and the reference signals S5A~S5C having logical "0" level will be transmitted from the second PWM pulse signal generation circuit 85A.

On the other hand, in each PWM converter 83A~83C, if the values X1, X2, X3 are negative values, after absolute value is being calculated and converted to positive integer, the value is set to the down counter (not shown in Fig.) in the second PWM pulse signal generation circuit 85B.

As a result, at this point, the first~the third PWM signals S4A~S4C of the fixed pulse width Ton corresponding to the values X1, X2, X3 will be transmitted from the second PWM pulse signal generation circuit 85B till values X1, X2, X3 to be stored in the register would be renewed as in the case of the first PWM pulse signal generation circuit 85A. Moreover, at this point, reference signals S5A~S5C of the logical "0" level will be transmitted from the first PWM pulse signal generation circuit 85B.

With this arrangement, the first~the third PWM converters 83A~83C generate the first~the third PWM S4A~S4C and the first~the third reference signals S5A~S5C with the pulse width Ton corresponding to the values X1, X2, X3 to be supplied, and transmit these to the coil driving block 34 of the power substrate 24 via the third cable 33 respectively.

(4) Relation between Coil Driving Current and Output Torque

At this point, the relation between the driving current Iu, Iv, Iw to be applied to each coil 11 of the U-phase, V-phase and W-phase of the motor unit 2 in this AC servo motor 1 and the rotation torque (hereinafter referred to as output torque) to be put out via the output axis 18 will be described in the following paragraphs:

Firstly, if the magnetic flux density at which each coil 11 of the U-phase, V-phase and W-phase intersects when the driving currents Iu, Iv, Iw are applied to each coil 11 of the U-phase, V-phase and W-phase to be ou, ov, ow, the output torque T ($\theta p$) can be given using the pole angle $\theta p$ of the rotor axis 6 of the motor unit 2 as the following EQUATION:

$$T(\theta p) = Iu \times \phi u \times K0 + Iv \times \phi v \times K0 + Iw \times \phi w \times K0 \quad (32)$$

In this EQUATION (32), K0 shows the fixed coefficient value when the driving currents Iu, Iv, Iw are applied to each coil 11.

Here, the driving currents Iu, Iv, Iw to be applied to each coil 11 of the U-phase, V-phase and W-phase can be controlled as the following EQUATIONS:

$$Iu = I0 \times \sin \theta p \quad (33)$$

$$Iv = I0 \times \sin\left(\theta p + \frac{2\pi}{3}\right) \quad (34)$$

$$Iw = I0 \times \sin\left(\theta p - \frac{2\pi}{3}\right) \quad (35)$$

Accordingly, each magnetic flux density ou, ov, ow becomes as follows:

$$\phi u = \phi 0 \times \sin \theta p \quad (36)$$

$$\phi v = \phi 0 \times \sin\left(\theta p + \frac{2\pi}{3}\right) \quad (37)$$

$$\phi w = \phi 0 \times \sin\left(\theta p - \frac{2\pi}{3}\right) \quad (38)$$

And substitute these EQUATIONS (33)~(38) into EQUATION (32).

Then, these can be expressed as the following EQUATIONS:

$$T(\theta p) = I0 \times \phi 0 \times K0 \Big\{ \sin\theta p \times \sin\theta p + \\ \sin\left(\theta p + \frac{2\pi}{3}\right) \times \sin\left(\theta p + \frac{2\pi}{3}\right) + \\ \sin\left(\theta p - \frac{2\pi}{3}\right) \times \sin\left(\theta p - \frac{2\pi}{3}\right) \Big\} \\ = I0 \times \phi 0 \times K1 \quad (39)$$

(Provided that $K1 = 1.5 K0$)

Then, the output torque T ($\theta p$) can be expressed as the above EQUATION.

Accordingly, in this AC servo motor 1, it is clear that the output torque corresponding to the magnitude of the driving current Iu, Iv, Iw to be applied to each coil 11 can be obtained.

(5) Software Control in AC Servo Motor 1

Next, the software control of this AC servo motor 1 in the calculation processing block 40 (FIG. 11) will be described in the following paragraphs.

As described above, in the calculation processing block 40, the CPU 60 executes the motor rotation control calculation processing, phase advance control processing, temperature compensation control processing and serial communication control processing in 1 (ms) time divisionally based on the servo interrupt signal S10 supplied from the counter timer control circuit 65 and the pertinent program stored in the ROM 61. In the following paragraphs the processing of the CPU 60 at the time of each processing mode will be described.

(5-1) Processing of CPU 60 at the Time of Motor Rotation Control Calculation Processing Mode The object of the processing of CPU 60 at the time of motor rotation control calculation processing mode is to calculate the target rotation torque T0 corresponding to the specification of the specified rotation position, specified rotational speed or the specified rotation torque value to be given from the upper rank controller as described above.

Then, when the specified rotation position Pref is given from the upper controller, the CPU 60 calculates the rotation position Pm of the output axis 18 (FIG. 1) based on the rotor axis pole rotation angle Pm1 to be stored in the resistor 41 by the rotor axis rotation angle detection processing block 42, and using this rotation position Pm, calculates the following EQUATIONS:

$$Vmref = (Pref - Pm) \times Kpp \quad (40)$$

$$Vm = Pm \times s \quad (41)$$

Then, the target rotational speed Vmref with respect to the specified rotation position Pref and the current rotational speed Vm of the output axis are calculated.

$$T0 = \left\{ (Vmref - Vm) \times \left(1 + \frac{Kvi}{S}\right) \right\} \times Kvp \quad (42)$$

By executing the above EQUATION from EQUATIONS (40) and (41), the target torque T0 can be calculated.

Furthermore, in the case where the specified rotation speed Vref is given from the upper rank controller, calculate the present rotation speed Vm of the output axis 18 using EQUATION (41), and by calculating the following EQUATION based on this rotation speed Vm the target torque T0 is calculated.

$$T0 = \left\{ (Vref - Vm) \times \left(1 + \frac{Kvi}{S}\right) \times Kvp \right\} \quad (43)$$

Moreover, when the specified rotation torque Tref is given from the upper rank controller, let this to be the target rotation torque T0 as it is.

In these EQUATIONS (40)~(43), S shows Laplace operator, and Kpp, Kvi and Kvp show control gain parameters to be set by the upper rank controllers respectively. And by changing values of these control gain parameters Kpp, Kvi and Kvp, the reaction of the AC servo motor 1 with respect to the specified rotation angle Pref and the specified rotation speed Vref can be changed.

Figure 18:
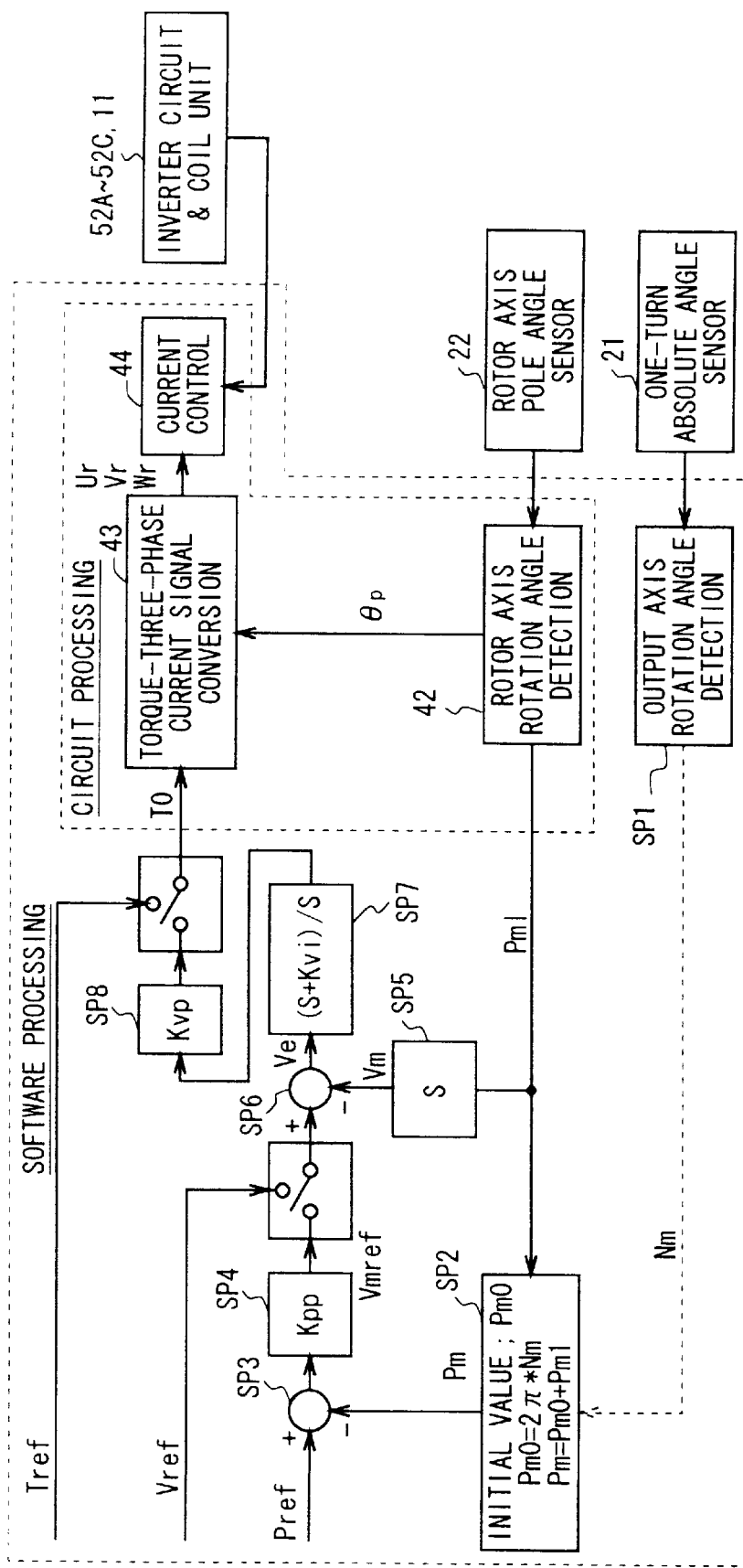
FIG. 18 is a block diagram illustrating the calculation processing of the CPU at the time of motor rotation control processing mode.

The detailed processing procedure of the CPU 60 at the time of motor rotation control calculation processing mode will be shown in FIG. 18.

When the specified rotation angle Pref is given from the upper rank controller, the CPU 60 firstly calculates the number of pole rotations of the rotor axis 6 (hereinafter referred to as the number of rotor axis pole rotations) Nm based on the first and the second absolute angle sensor data D1A, D1B stored in the register 41 (step SP1).

The number of rotor axis pole rotations Nm is defined as the number of rotations that makes the magnetic flux change by a pair of N pole and S pole adjacent to the resin magnet 25 to be detected by the first~the fourth Hall elements 26A~26D of the rotor axis pole angle sensor 22 accompanied by the rotation of the rotor axis 6 as one revolution. According to this embodiment, since the resin magnet 25 is magnetized to 4 poles, the number of rotations of the rotor axis pole Nm becomes 2 when the rotor axis 6 makes one full turn mechanically.

Figure 19:
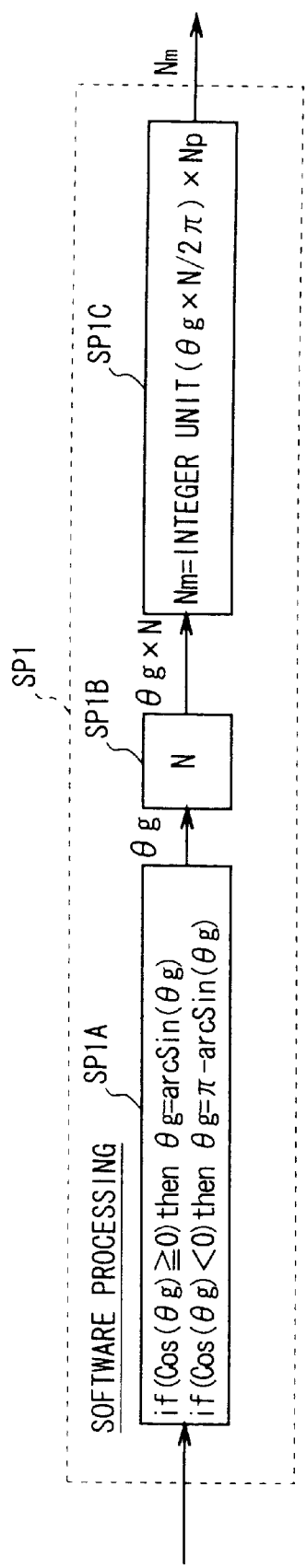
FIG. 19 is a block diagram showing the number of motor axis pole rotations detection processing procedure.

Then, the number of rotations of the rotor axis pole Nm can be obtained according to the number of rotor axis pole rotations detection processing procedure shown in FIG. 19 by calculating the phase θg of the first and the second one-turn absolute angle sensor signals S1A, S1B expressed by sin θg, cos θg respectively by the software processing based on the first and the second absolute angle sensor data D1A, D1B stored in the resistor 41 (step SPLA), and by multiplying this phase θg by the gear ratio N of the planet gear mechanical unit 16 of the torque amplifier 3 (step SP1B), and by dividing the multiplication result by 2π and multiplying the resulting integer part by the value Np a half of the number of poles of the resin magnet 25 (according to this embodiment 4) of the rotor axis pole angle sensor 22 (FIG. 1) (step SP1C).

Furthermore, as shown in FIG. 18, based on thus calculated number of rotations of the rotor axis pole Nm and the rotor axis pole rotation angle data Pm1 stored in the resistor 41, the CPU executes the following EQUATION:

$$Pm0=2\pi \times Nm \quad (44)$$

Assuming that Pm0 obtained by the above EQUATION to be the initial value, the CPU 60 executes the following calculation:

$$Pm=Pm0+Pm1 \quad (45)$$

Then, the rotational angle Pm of the output axis 18 at that time can be calculated (step SP2).

And the CPU 60, by subtracting the rotation angle Pm from the specified rotation angle Pref, detects the difference (hereinafter referred to as rotation angle error) Pe with respect to the specified rotation angle Pref (step SP3).

Next, the CPU 60, by multiplying this rotation angle error Pe by the proportional gain Kpp, calculates the target rotation angle Vmref with respect to the specified rotation angle Pref (step SP4).

And then, the CPU 60, by differentiating the rotor axis pole rotation angle Pm1 stored in the register 41, calculates the rotation speed Vm of the output axis at that time (step SP5), and also by subtracting the rotational speed Vm calculated at the step SP5 from the target rotation speed Vmref calculated at the step SP4 calculates the speed error Ve (step SP6).

Next, the CPU 60 successively multiplies this speed error Ve (step SP7 and step SP8) by the speed integer gain and the proportional gain Kvp to be obtained by the following EQUATION:

$$\frac{S+Kvi}{S} \quad (46)$$

Thus, the target rotation torque T0 can be obtained.

When the specified rotation speed Vref is given from the upper rank controller at the time of motor rotation control calculation processing mode, the CPU 60 starts this processing from the step SP6, and when the rotation torque Tref is given, the CPU 60 stores this as it is in the register 41 as the target rotation torque T0.

(5-2) Processing of CPU 60 at the Time of Phase-advance Control

Processing Mode

At first, the phase-advance control will be explained. Each driving current Iu, Iv, and Iw to be supplied to each coil of the U-phase, V-phase and W-phase of the motor unit 2 will be controlled so that it becomes as EQUATIONS (33), (34), (35) in the torque three-phase current signal conversion processing block 43 and the current control processing block 44 respectively.

At this point, for example, if the rotor 9 is revolving at high speed, in practice, a delay occurs in driving currents Iu, Iv, Iw running each coil 11 of the U-phase, V-phase and W-phase due to impedance of the coil 11, even though the driving currents Iu, Iv, Iw like EQUATIONS (33), (34), and (35) are given to each inverter circuit 52A~52C of the power substrate 24. As a result, output torque decreases.

In order to improve this problem, the phase advance control is proposed.

$$Iu=I0\times\sin(\theta p+\theta off) \quad (47)$$

$$Iv = I0\times \sin\left(\theta p + \frac{2\pi}{3} + \theta off\right) \quad (48)$$

$$Iw = I0\times \sin\left(\theta p - \frac{2\pi}{3} + \theta off\right) \quad (49)$$

As above EQUATIONS, the phase advance control is the control to advance the phase of driving current Iu, Iv, Iw to be applied to each coil 11 of U-phase, V-phase, W-phase for the corrected value θoff corresponding to the rotation speed of the rotor 9 in advance.

And in practice, as this phase advance control processing, the CPU 60 calculates the compensation value Ooff from the following EQUATION in utilizing the rotation speed Vm calculated at the step SP5 in FIG. 18.

$$\theta off=Vm\times Kv \quad (50)$$

Then, the CPU 60, by giving this to the torque three-phase current signal conversion processing block 43, controls the first the third current specification value Ur, Vr, Wr to be generated in said torque three-phase current signal conversion processing block 43 to be advanced for the corrected value θoff like EQUATIONS (47)~(49).

In EQUATION (50), Kv is a gain to determine the relation between the rotation speed of the output axis and the amount of phase advance correction and is a constant to be determined according to the specification of each coil 11 of the motor unit 2.

(5-3) Processing of CPU 60 at the Time of Temperature Compensated Control Processing Mode In the ACC servo motor utilized permanent magnet, heat is produced by heating of currents running in the coil and eddy currents loss. And the magnetic characteristics of permanent magnet changes due to such heat. In general, if currents are run under high temperature circumstances and high magnetic flux density would be added, the permanent magnet is demagnetized. Accordingly, in general, it is so designed that the maximum value of coil current is controlled to low value from a safety standpoint.

The temperature compensated control is the control to utilize the magnetic characteristics that the permanent magnet has most effectively by controlling the maximum current permissible by temperature.

As shown in FIG. 9, according to the present embodiment, temperature sensor signal S14 to be supplied from the temperature sensor 29 of the control substrate 23 is stored in the register 41 as a temperature sensor data D14 via the fourth analog/digital conversion circuit 48 of the one-chip microcomputer 27.

Then, based on the value TH of this temperature sensor data D14, the CPU 60 calculates the maximum value of I0, Imax in EQUATIONS (33)~(35) according to the following EQUATION:

$$I\text{max} = TH \times Kth \tag{51}$$

Then, based on this calculation result, by controlling the torque three-phase current signal conversion processing block 43, the CPU 60 sets the upper limit of the driving current Iu, Iv, Iw to flow into each coil 11 of the U-phase, V-phase and W-phase of the motor unit 2. In this connection, Kth is a temperature coefficient to be determined according to the temperature characteristics of the permanent magnet (according to the present embodiment, the rotor magnet 8 of the rotor 9 (FIG. 1)).

(5-4) Processing of CPU 60 at the Time of the Serial Communication Processing Mode At the time of serial communication processing mode, the CPU 60 communicates between the upper controllers and inputs control commands and conversion parameter, or transmits internal signals for monitor.

(5-5) Processing of CPU 60 at the Time of the External Force Estimated Processing Mode At this point, in the case of this AC servo motor 1, in the calculation processing block 40, the magnitude of the External force (load torque) to be given to the output axis 18 can be estimated in addition to the motor rotation control calculation processing, the phase advance control processing, the temperature compensated control processing and the serial communications control processing as described above.

Figure 20:
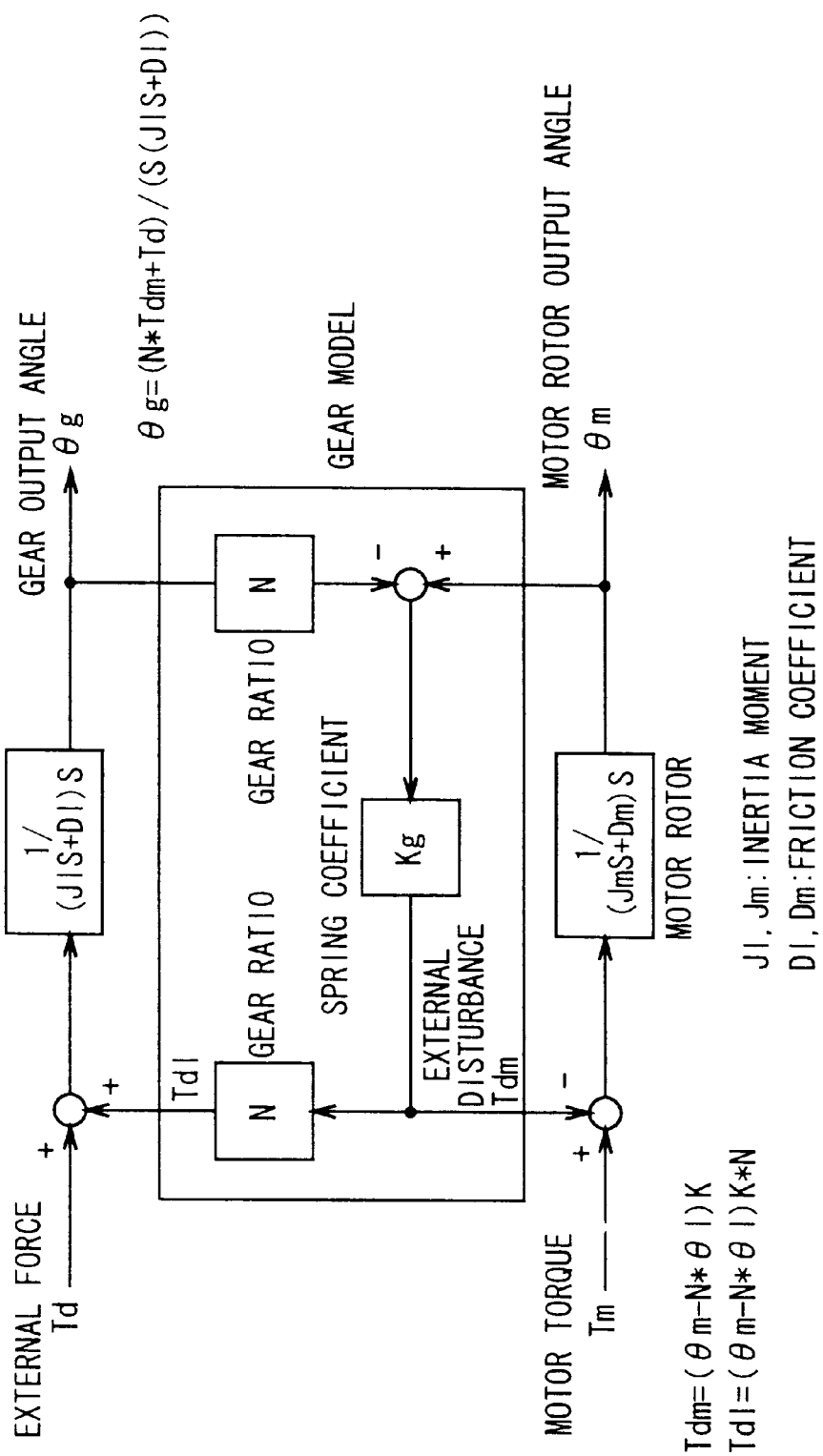
FIG. 20 is a block diagram showing a mathematical model of the rotor and the gear system.

In this case, the relation between an output torque Tm in the general motor Tm, the mechanical rotational angle of the rotor θm, the External force to be given to the output axis Td, the output angle of gear system (hereinafter referred to as a rotation angle of the output axis) θg can be expressed as FIG. 20.

More specifically, the mechanical rotation angle of the rotor θm can be calculated by subtracting the structural load torque Tdm of the gear system from the output torque Tm and by multiplying the resultant by the following EQUATION.

$$\frac{1}{(Jm \times S + Dm) \times S} \tag{52}$$

In the above EQUATION, Jm shows the inertial moment of the rotor, and Dm shows the friction coefficient of the rotor bearing.

Furthermore, the rotation angle of the output axis θg can be calculated by adding the External force Td and the multiplication result obtained by multiplying the mechanical torque Tdm of the gear system by the gear ratio N (hereinafter referred to as structural output axis load torque) Td1, and by multiplying this addition result Td1 by the following EQUATION:

$$\frac{1}{(J1 \times S + D1) \times S} \tag{53}$$

In this connection, J1 shows the inertial moment, D1 shows the friction coefficient in the gear system, and S shows Laplace operator.

Furthermore, the structural load Tdm of the gear system can be obtained by subtracting the multiplication result obtained by multiplying the rotation angle θg of the output axis by the gear ratio N in the gear system from the mechanical rotation angle θm of the motor rotor, and by multiplying the subtraction result by the spring coefficient Kg in the gear system.

Figure 21:
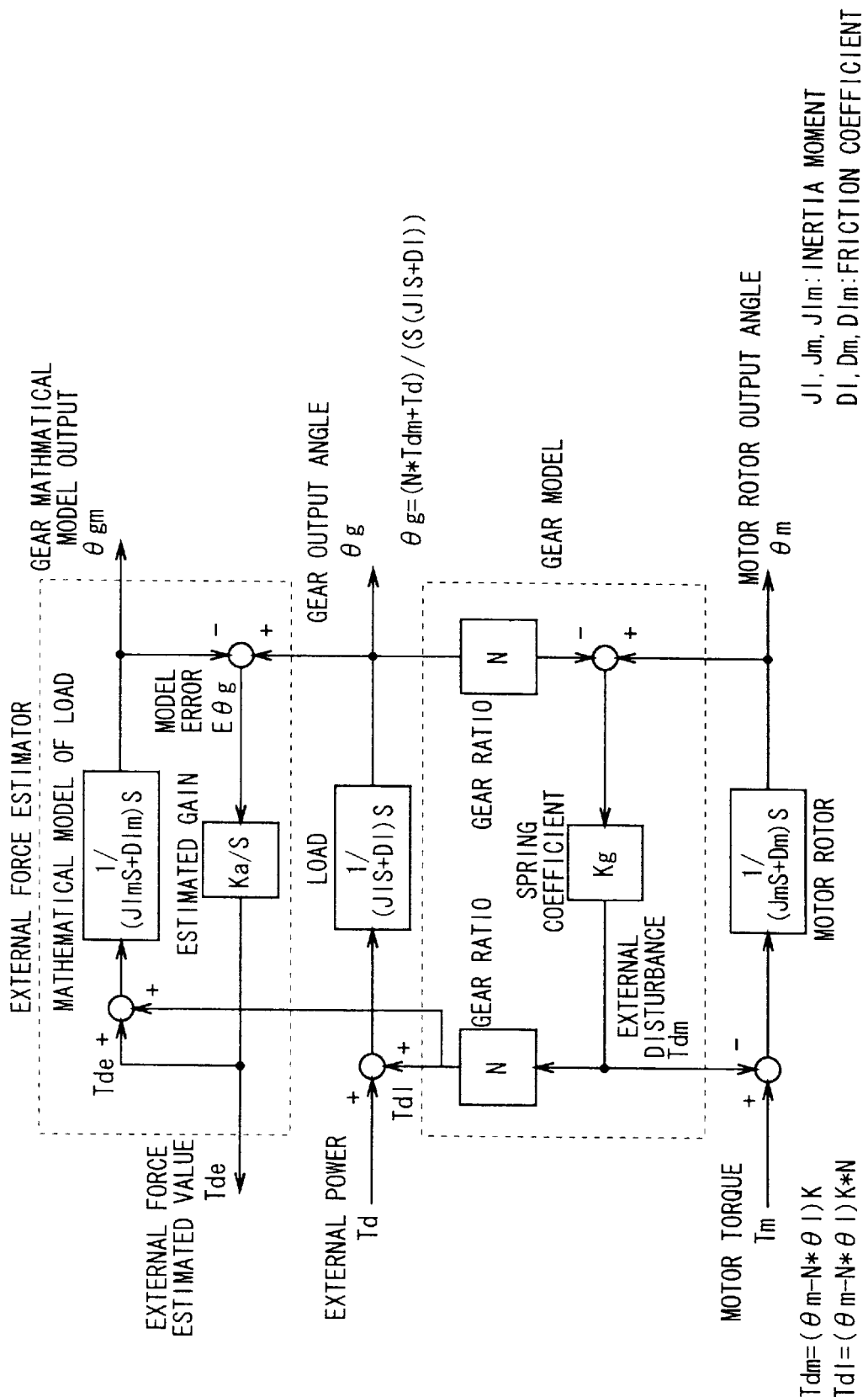
FIG. 21 is a block diagram illustrating the calculation processing of CPU at the time of External force estimated processing mode.

Based on such principle the CPU 60 estimates the magnitude of the External force to be given to the output axis 18 from the outside according to the following procedures shown in FIG. 21.

More specifically, firstly, the CPU 60 generates an initial value having the appropriate value as the estimated value of the External force (hereinafter referred to as External force estimated value) Tde, and multiplies the addition result of said External force estimated value Tde and the mechanical output axis load torque Td1 of the planet gear system 16 by the following EQUATION:

$$\frac{1}{(Jlm \times S + Dlm) \times S} \tag{54}$$

Then, the CPU 60 can obtain mathematical model rotational angle θgm of the output axis 18.

Then, by subtracting this rotational angle θgm from the actual rotation angle θg of the output axis 18 obtained from the calculation, an error of the mathematical model rotation angle θgm (hereinafter referred to as a model error) Eθg with respect to the actual rotation angle θg will be calculated. And multiplying this model error Eθg by the estimated gain to be given by the following EQUATION, the External force estimated value Tde can be calculated.

$$\frac{Ka}{S} \tag{55}$$

In this EQUATION (55), Ka is the constant positive coefficient value.

Then, the CPU 60, successively renewing the External force estimated value Tde to the newly obtained external estimated value Tde, repeats the above calculation processing. As a result, by repeating such calculation processings, the model error Eθg will converge to 0 value and the external estimated value Tde will reach closer to the magnitude of the External force to be actually given to the output axis 18.

Then, the external estimated value Tde when the model error Eθg becomes 0 can be assumed the External force actually given to the output axis 18, and the CPU makes this value as the external estimated value Tde obtained by the calculation.

Then, the CPU 60 transmits this External force estimated value Tde to the upper rank controller, or under the control of the upper rank controller, executes the generation and output of the output torque competing with the External force given to the output axis 18, and the generation and output control of the output torque exceeding the External force, or the generation and the output control of the output torque lower than the External force.

According to the embodiment of the present invention, the magnitude of the External force to be given to said output axis 18 will be estimated based on the rotation displacement of the output axis 18 detected by the one-turn absolute angle sensor 21 as described above. Accordingly, the deceleration system of the torque amplifier unit 3 (planet gear system 16) is constructed so that the input axis (rotor axis 6) can have sufficient back drivability to cause the displacement corresponding to the External force to be given to the output axis 18.

(6) Operation and Effects of the Embodiment

According to the foregoing construction, in this AC servo motor 1, based on the specified rotation angle, the specified rotation speed or the specified rotation torque, the first~the third current command values Ur, Uv, Wr formed of driving currents Iu, Iv, Iw to be applied to each coil 11 of the U-phase, V-phase and W-phase will be calculated respectively in the one-chip microcomputer 27 of the control substrate 23. And the first third PWM signal S4A~S4C based on the first~the third current command values Ur, Vr, Wr will be transmitted to the coil driving block 34.

Then, the coil driving block 34 of the power substrate 24 forms driving currents Iu, Iv, Iw based on the first~the third PWM signals S4A~S4C supplied, and applying these to each coil 11 of the U-phase V-phase and W-phase, rotates the rotor 9.

In this AC servo motor 1, since the control substrate 3 and the power substrate 24 as the control means to control the rotation of the rotor 9 are stored in the motor case 4 together with the stator formed by stator iron core 10A and coil 11, the amount of wirings connecting to outside can be remarkably decreased and at the same time the amount of overall wirings as an actuator system can be decreased.

Furthermore, in this case, the PWM converters 83A~83C (switching elements) are stored in the motor case 4 formed of conductive material. Therefore, mal-effects of the switching noise to outside can be outstanding decreased as compared with the case of giving the PWM signal (switching signal) from the outside to the AC servo motor as the conventional AC servo motor. Moreover, as the second cable to connect the AC servo motor 1 and the upper rank controller, comparatively common one can be used.

Furthermore, in this AC servo motor 1, since the rotor axis pole angle sensor 22 is placed near the rotor 9 in the motor case 4 and the rotor rotational angle θm is to be obtained based on the output of said rotor axis pole angle sensor 22, positioning can be conducted efficiently and at high speed without enlarging the rotor axis 6, and thus, the device can be constructed mini-sized as a whole.

Furthermore, since the rotor axis pole angle sensor 22 is placed adjacent to the rotor 9 in the motor case 4, there occurs little mechanical fluctuations and the rotation angle of the rotor axis 6 can be detected with high stability.

Furthermore, in this AC servo motor 1, since the temperature sensor 29 is provided adjacent to the rotor magnet 8 in the motor case 4, the upper limit of driving current Iu, Iv, Iw that can be actually applied to each coil 11 according to the magnetic characteristic of the rotor magnet 8 based on the output of said temperature sensor 29 can be obtained correctly and easily. And thus, increasing the upper limit of the driving current Iu, Iv, Iw, the maximum output torque can be increased as compared the conventional case of setting the upper limit considering a safety measure.

Moreover, in this AC servo motor 1, since the rotor 9 and the control circuit to control the rotation of said rotor 9 are arranged on the plane surface, this AC servo motor 1 can be constructed mini-sized and compressed.

Furthermore, since the construction of this AC servo motor 1 is simple and there exist small number of parts, this AC servo motor has an advantage capable of simplifying the assembly work and the adjusting work when manufacturing.

According to the foregoing construction, since the control substrate 23 and the power substrate 24 to control the motor unit 2 are stored inside of the motor case with the rotor 9 and the stator, the amount of connecting wires to outside of the AC servo motor 1 can be remarkably decreased and simultaneously the amount of wirings of the actuator system as a whole can be decreased. Thereby, the AC servo motor capable of simplifying the construction of the whole actuator system can be realized.

Moreover, since the rotor axis pole angle sensor 22 to detect the rotation angle of the rotor axis 6 is arranged adjacent to the rotor 9 in the motor case 4, the positioning can be conducted with high efficiency and at high speed without enlarging the rotor axis 6. And thus, the AC servo motor capable of miniaturizing and improving the performance can be realized.

Furthermore, since the temperature sensor 29 is provided adjacent to the rotor magnet 8 in the motor case 4, based on the output of said temperature sensor 29 the upper limit of the driving current Iu, Iv, Iw that can be actually applied to each coil 11 according to the magnet characteristic of the rotor magnet 8 can be obtained correctly and easily. And thus, increasing the upper limit of the driving current Iu, Iv, Iw, the maximum output torque can be increased as compared with the conventional case of setting the upper limit of the driving current Iu, Iv, Iw, considering safety measure. Thereby, the AC servo motor capable of improving the performance can be obtained.

(7) Other Embodiments

The embodiment described above has dealt with the case of applying the present invention to the AC servo motor. However, the present invention is not only limited to this but also, in short, if the actuator device in which a rotor axis supported rotation free (rotor axis 6 according to this embodiment) and the driving means for rotating the rotor axis (according to this embodiment, rotor 9, and the stator formed of stator iron core 10 and coil) are stored in the housing (motor case 4 according to this embodiment), various other actuator devices can be widely applied.

Furthermore, the embodiment described above has dealt with the case of magnetizing to 4 poles of rotor magnet 8 for example. However, the present invention is not only limited to this but also it may magnetize to 8 poles or the other number of poles.

Furthermore, the embodiment described above has dealt with the case of forming the control substrate 23 and power substrate 24 separately as the control means to control the rotation of the rotor 9. However, the present invention is not only limited to this but also these may be formed in a single piece.

Moreover, the embodiment described above has dealt with the case of controlling the rotation of the rotor 9 based on the specified rotation angle, the specified rotation speed or the specified rotator torque that the one-chip microcomputer 27 is supplied from the upper rank controller. However, the present invention is not only limited to this but also the rotation of the rotor 9 may be controlled based on varying patterns of the pre-programmed rotation angle, rotation speed or the rotation torque.

Furthermore, the embodiment described above has dealt with the case of forming the rotor axis pole angle sensor 22 as the rotor axis rotation displacement detection means to detect the rotation displacement of the rotor axis 6 by the resin magnet 25 magnetized with the predetermined pattern (the first component) and the first~the fourth Hall elements 26A~26D (the second component). However, the present invention is not only limited to this but also various other constructions can be widely applied.

Furthermore, the embodiment described above has dealt with the case of detecting the pole angle θp of the rotor axis 6 as the rotation displacement of the rotor axis 6. However, the present invention is not only limited to this but also the rotation displacement information other than the pole angle θp may be detected.

Moreover, the embodiment described above has dealt with the case of applying the coil 11 as the magnetic field generating means to generate magnetic field having the magnitude corresponding to the current value of the driving current Iu, Iv, Iw to be supplied from the power substrate 24 in the rotor unit 2. However, the present invention is not only limited to this but also various other magnetic field generating means can be widely applied.

Furthermore, the embodiment described above has dealt with the case of constructing the driving current value detection means to detect the current values of the driving currents Iu, Iv, Iw for applying to each coil 11 of the U-phase, V-phase nd W-phase by the coil 53 (FIG. 10). However, the present invention is not only limited to this but also the driving current value detection means with various other constructions can be applied.

Moreover, the embodiment described above has dealt with the case of providing the RS-232C serial communication capability and the synchronous serial communication capability to the one-chip microcomputer 27 of the control substrate 23 as the serial communication system to communicate with the upper rank controller. However, the present invention is not only limited to this but also serial communication capability other than these may be provided.

Figure 5:
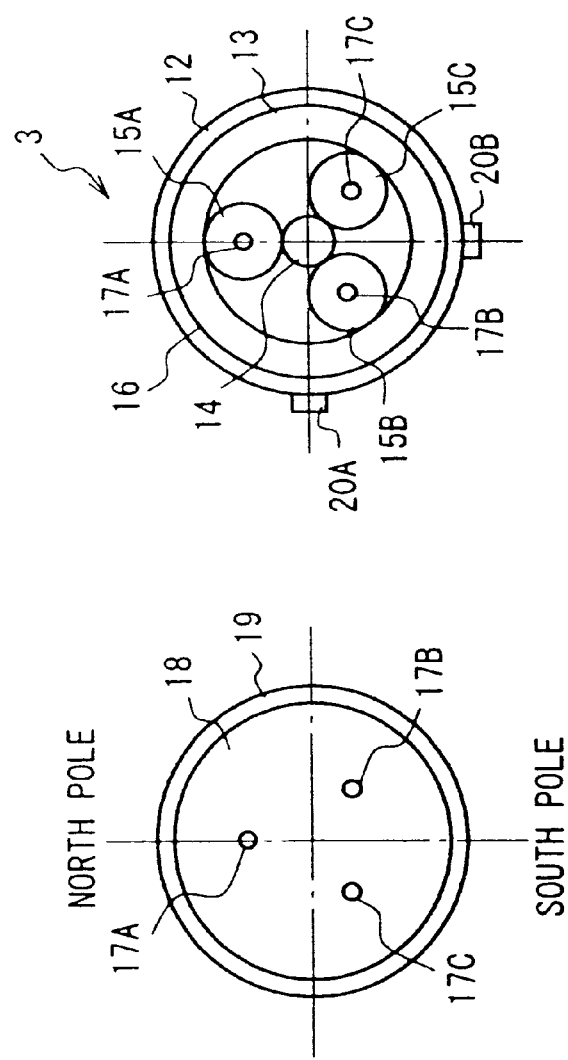
FIGS. 5(A), 5(B) and 5(C) are brief linear diagrams showing the construction of a torque amplifier unit.

Moreover, the embodiment described above has dealt with the case of constructing the torque amplifying means to amplify the rotation torque generated at the motor unit 2 by the planet gear system 16 shown in FIG. 5. However, the present invention is not only limited to this but also various other constructions can be widely applied.

Moreover, the embodiment described above has dealt with the case of forming the one-turn absolute angle sensor 21 as the output axis rotation displacement detection means to detect the rotation displacement of the output axis 18 by the resin magnet 19 and the first~the second Hall elements 20A, 20B. However, the present invention is not only limited to this but also various other constructions can be widely applied.

Furthermore, the embodiment described above has dealt with the case of constructing the calculation means to detect the load torque (External force) to be given to the output axis 18 from the outside by the one-chip microcomputer 27 based on the first and the second one-turn absolute angle sensor signals S1A, S1B to be supplied from the one-turn absolute angle sensor 21 and the first and the second rotor axis pole angle sensor signals S2A, S2B to be put out from the rotor axis pole angle sensor 22. However, the present invention is not only limited to this but also these may be formed separately from the one-chip microcomputer 27.

Moreover, the embodiment described above has dealt with the case of decreasing the effects of changes of the source current by feedback controlling the current value of each driving current Iu, Iv, Iw based on each driving current Iu, Iv, Iw to be applied to each coil 11 of the U-phase, V-phase, W-phase detected at the power substrate 24. However, the present invention is not only limited to this but also the current value of each driving current Iu, Iv, Iw to be applied to each coil 11 of the U-phase, V-phase, and W-phase may be controlled by the open loop control.

In practice, as such method, firstly, detect the magnitude of the source voltage Vcm.

$$Gv = \frac{Kvcc}{Vcm} \tag{56}$$

And based on the above detection result, the gain Gv in the current control processing block 44 may be adjusted as the above EQUATION.

INDUSTRIAL APPLICABILITY

The present invention can be applied to an AC servo motor.

What is claimed is:

1. An actuator device, comprising:
   a housing;
   a freely rotatable rotor axis supported within the housing;
   driving means for driving the rotor axis, the driving means being rotatable about the rotor axis and stored within the housing;
   control means for controlling the rotation of the rotor axis via the driving means, the control means being provided within the housing;
   rotor axis rotation displacement detection means for detecting a rotation displacement of the rotor axis, the rotation displacement detection means being provided in the housing;
   torque amplification means for amplifying rotation torque output from the rotor axis;
   an output axis for rotating based on the rotation torque amplified by the torque amplification means;
   an output axis rotation displacement detection means for detecting a rotation displacement of the output axis; and
   calculation means, wherein the torque amplification means has reversible driving power sufficient for an input axis to generate a displacement corresponding to load torque externally given to the output axis, and the calculation means detects the load torque based on the detection results of the rotor axis rotation displacement detection means and the output axis displacement detection means.

2. An actuator device as defined in claim 1, wherein the control means controls the rotation angle, the rotational speed and the rotation torque of the rotor axis.

3. An actuator device as defined in claim 1, wherein the control means controls the driving means such that the rotor axis rotates in response to an external driving command.

4. An actuator device as defined in claim 3, wherein the control means is capable of external communication via a predetermined serial communication system.

5. An actuator device as defined in claim 4, wherein the predetermined serial communication system includes at least one of an RS-232C serial communication system and a synchronous communication system.

6. An actuator device as defined in claim 1, wherein the rotor axis rotation displacement detection means includes a first component provided integral with the rotor axis and a second component placed on a predetermined fixed position in the housing, and detects the rotation displacement of the rotor axis by detecting a rotation displacement of the first component rotatable about the rotor axis via the second component.

7. An actuator device as defined in claim 6, wherein the first component includes a magnet magnetized with a predetermined pattern and the second component includes a magnetic sensor.

8. An actuator device as defined in claim 1, wherein:

the driving means includes a permanent magnet magnetized with a predetermined pattern and integrated concentrically with the rotor axis and magnetic field generating means for generating a rotation power centering around the rotor axis to the permanent magnet by generating a magnetic field having a magnitude corresponding to an electric current value of a driving electric current given from the control means; and the control means calculates a rotational speed of the rotor axis based on a detection result from a rotor axis rotation displacement detection means and advances a phase of the driving electric current according to the calculation result.

9. An actuator device as defined in claim 1, wherein:

the driving means includes a permanent magnet magnetized with a predetermined pattern and integrated concentrically with the rotor axis, a magnetic field generating means for generating a rotation power centering about the rotor axis to the permanent magnet by generating a magnetic field having a magnitude corresponding to a driving electric current value given from the control means, and a temperature sensor for detecting a temperature of the permanent magnet, the sensor being provided in the housing; and the control means sets an upper limit of the driving electric current value based on the detection result of the temperature sensor.

10. An actuator device as defined in claim 1, wherein:

the driving means generates a rotation power corresponding to a driving electric current value given from the control means to the rotor axis;

the actuator device further comprises driving current value detection means for detecting the driving electric current value, the driving current value detection means being provided in the housing; and the control means controls the driving electric current value based on the detection result of the driving current value detection means.

11. An actuator device as defined in claim 1, wherein:

the driving means generates a rotation power corresponding to a driving electric current value given from the control means onto the rotor axis;

the control means forms a control unit to generate a pulse signal showing the driving electric current value, forms the driving electric current value corresponding to the pulse signal, and has a driving current forming unit to supply the driving electric current value to the driving means; and the housing is formed of conductive materials.

12. An actuator device, comprising:

a housing;

a freely rotatable rotor axis supported within the housing;

driving means for rotating the rotor axis, the driving means being stored within the housing;

rotor axis rotation displacement detection means for detecting a rotation displacement of the rotor axis;

torque amplification means for amplifying rotation torque output from the rotor axis;

an output axis for rotating based on the rotation torque amplified by the torque amplification means;

an output axis rotation displacement detection means for detecting a rotation displacement of the output axis; and calculation means, wherein the torque amplification means has reversible driving power sufficient for an input axis to generate a displacement corresponding to load torque externally given to the output axis, and the calculation means detects the load torque based on the detection results of the rotor axis rotation displacement detection means and the output axis displacement detection means.

13. An actuator device comprising:

a freely rotatable rotor axis;

a permanent magnet integrated concentrically with the rotor axis;

magnetic field generating means for generating a rotation power onto the permanent magnet centering about the rotor axis by generating a magnetic field having a magnitude corresponding to a driving electric current value to be supplied; and a temperature sensor for detecting a temperature of the permanent magnet.

\* \* \* \* \*